(12) United States Patent
Huang et al.

(10) Patent No.: US 12,487,218 B2
(45) Date of Patent: Dec. 2, 2025

(54) POLYMER NANOSTRUCTURES, METHODS OF MAKING SAME, AND USES THEREOF

(71) Applicant: CORNELL UNIVERSITY, Ithaca, NY (US)

(72) Inventors: Yuming Huang, Ithaca, NY (US); Christopher K. Ober, Ithaca, NY (US)

(73) Assignee: Cornell University, Ithaca, NY (US)

( * ) Notice: Subject to any disclaimer, the term of this patent is extended or adjusted under 35 U.S.C. 154(b) by 284 days.

(21) Appl. No.: 18/103,274

(22) Filed: Jan. 30, 2023

(65) Prior Publication Data

US 2023/0243794 A1    Aug. 3, 2023

Related U.S. Application Data

(60) Provisional application No. 63/304,186, filed on Jan. 28, 2022.

(51) Int. Cl.
| | |
|---|---|
| *G01N 33/00* | (2006.01) |
| *G01N 21/64* | (2006.01) |
| *G03F 7/00* | (2006.01) |

(52) U.S. Cl.
CPC ..... *G01N 33/0047* (2013.01); *G01N 21/6428* (2013.01); *G03F 7/0015* (2013.01); *G01N 2021/6439* (2013.01)

(58) Field of Classification Search
CPC ........... G01N 33/0047; G01N 21/6428; G01N 2021/6439; G01N 21/643; G01N 2021/7786; G03F 7/0015
USPC ............. 73/31.01–31.6, 53.01, 61.41, 61.43, 73/64.56; 422/68.1, 82.01–82.11, 83, 86
See application file for complete search history.

(56) References Cited

FOREIGN PATENT DOCUMENTS

| CN | 102007396 A | * | 4/2011 | ........... G01N 21/583 |
|---|---|---|---|---|
| CN | 110621356 A | * | 12/2019 | ............ A61L 27/06 |
| CN | 111118450 A | * | 5/2020 | |
| KR | 20070105568 A | * | 10/2007 | |

(Continued)

OTHER PUBLICATIONS

Huang, et al., "High-Resolution Nanopatterning of Free-Standing, Self-Supported Helical Polypeptide Rod Brushes via Electron Beam Lithography," ACS Macro Lett. 2021, 10, 755-759.

(Continued)

*Primary Examiner* — Robert R Raevis
(74) *Attorney, Agent, or Firm* — Young Basile Hanlon & MacFarlane, P.C.

(57) ABSTRACT

Polymer nanostructures and compositions, devices, and systems comprising polymer nanostructures. In various examples, a composition, a device, or a system comprises a plurality of polymer nanostructures. The polymer nanostructures are disposed on a surface of a substrate. In various examples, the polymer nanostructures are disposed in predetermined pattern on a surface of a substrate. In various examples, the polymer nanostructures are self-supporting. In various examples, a polymer nanostructure comprises a polypeptide group or the like. In various examples, a polymer nanostructure comprises an end group, such as, for example, a fluorescent end group, or the like. In various examples, a system is a sensor, which can be used to analyze a sample. In various examples, a composition, a device, or a system is used to analyze samples, such as, for example, samples comprising one or more volatile organic compound(s).

27 Claims, 28 Drawing Sheets

(56) References Cited

FOREIGN PATENT DOCUMENTS

| KR | 100980284 B1 | * | 9/2010 | |
|---|---|---|---|---|
| KR | 20100124870 A | * | 11/2010 | |
| KR | 20190123974 A | * | 11/2019 | |
| WO | 20210125785 A | * | 4/2021 | |
| WO | WO-2021075846 A1 | * | 4/2021 | ........ B01L 3/502707 |

OTHER PUBLICATIONS

Munshi, et al., "Selective area growth of AlGaN nanopyramid arrays on graphene by metal-organic vapor phase epitaxy," Applied Physics Letters 113, 263102 (2018).

Tran, et al., "Synthesis, Processing, and Characterization of Helical Polypeptide Rod-Coil Mixed Brushes," ACS Macro Lett. 2018, 7, 1186-1191.

* cited by examiner

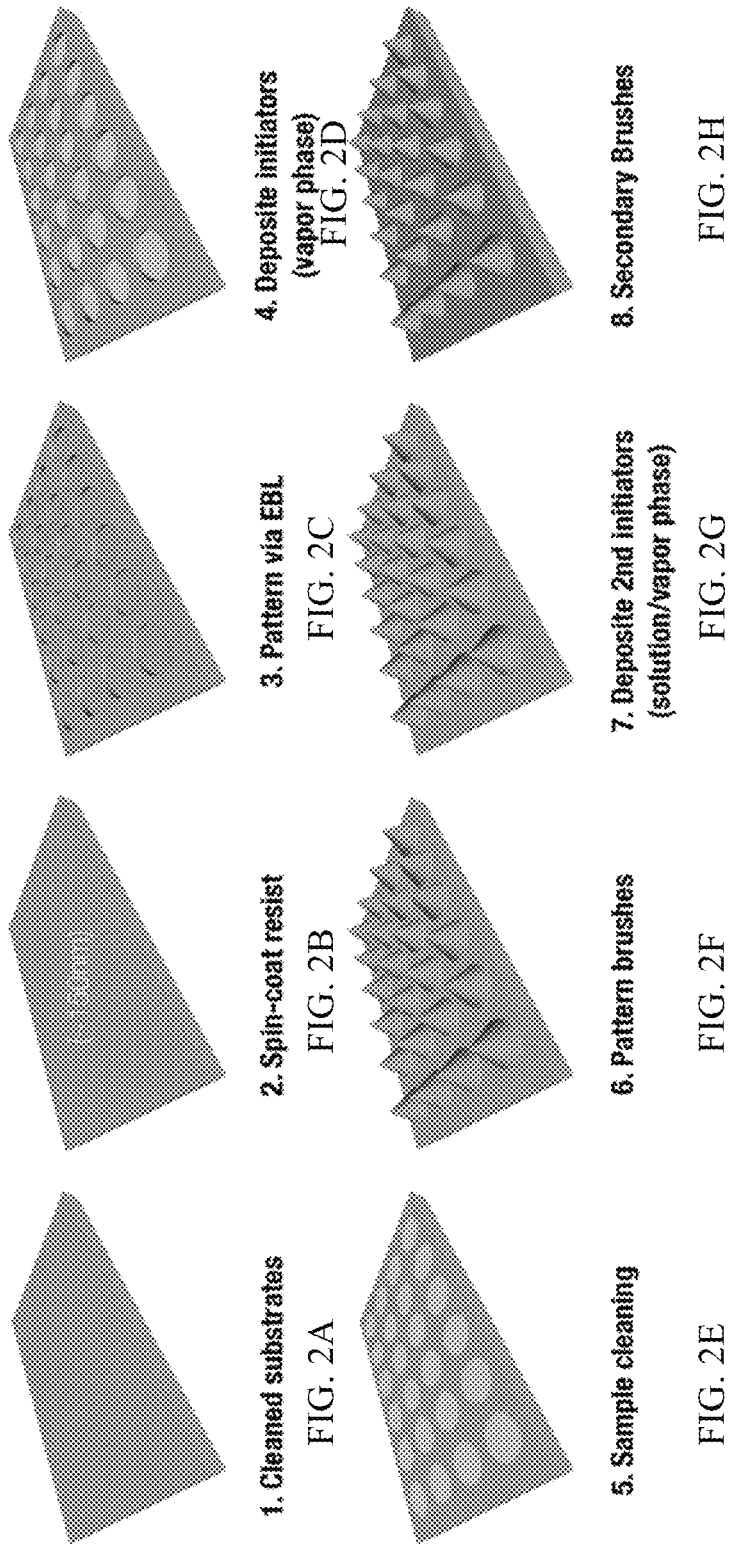

|  | Benzene | Toluene | Xylene | Chloroform | Quenched | Free RhB |
|---|---|---|---|---|---|---|
| $\lambda_{max}$ | 537 nm | 555 nm | 555 nm | 559 nm | 542 nm | 582 nm |
| Shoulder Intensity$_{max}$ | 0.53 | 0.24 | 0.04 | 0.22 | 0.13 | N.A. |
| Thickness | ~50 nm | ~100 nm | ~125 nm | ~80 nm | ~175 nm | N.A. |

FIG. 7B

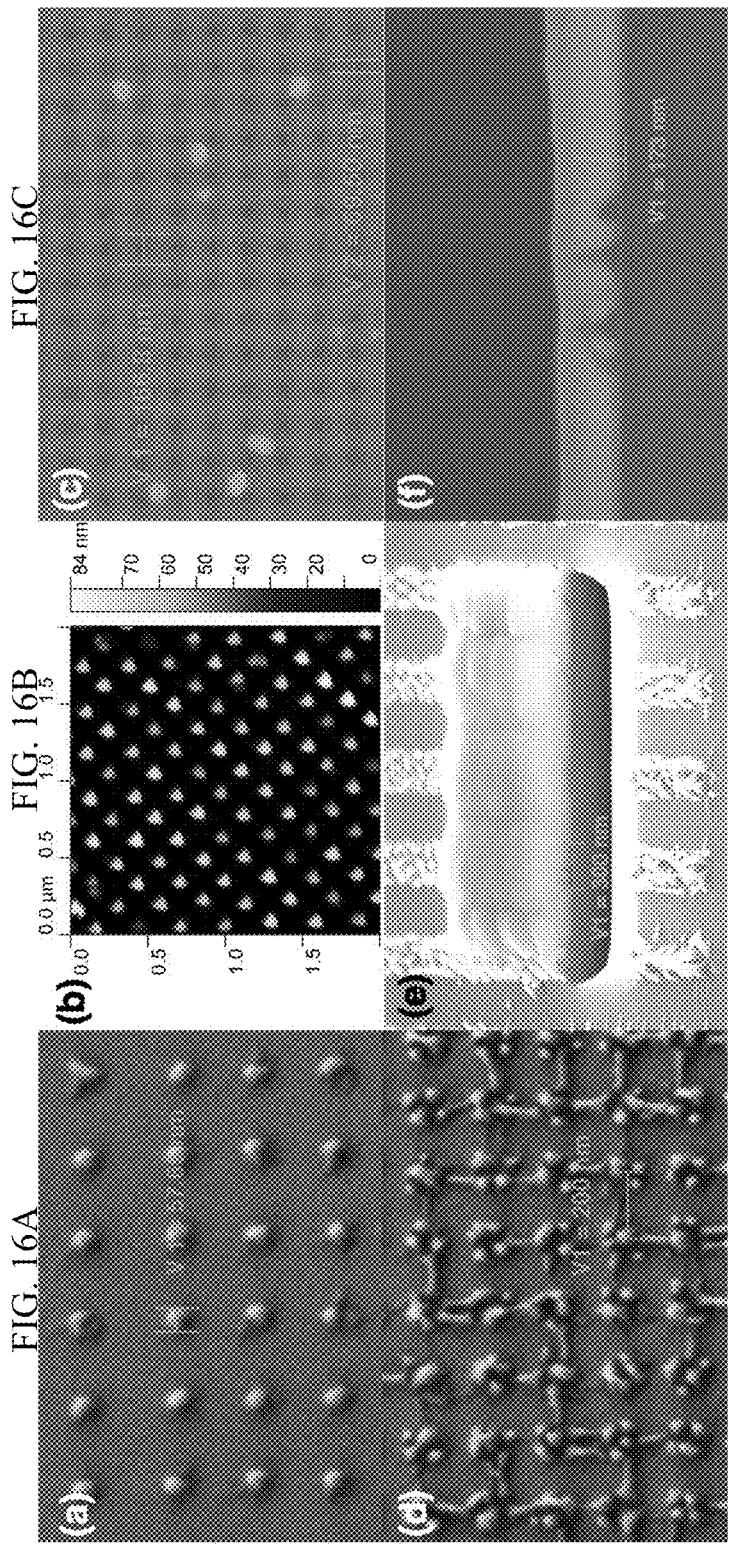

POLYMER NANOSTRUCTURES, METHODS OF MAKING SAME, AND USES THEREOF

CROSS-REFERENCE TO RELATED APPLICATIONS

This application claims the benefit of U.S. Provisional Patent Application No. 63/304,186, filed Jan. 28, 2022, the contents of the above-identified application are hereby fully incorporated herein by reference in their entirety.

STATEMENT REGARDING FEDERALLY SPONSORED RESEARCH

This invention was made with government support under grant no. 1905403 awarded by the National Science Foundation. The government has certain rights in the invention.

BACKGROUND OF THE DISCLOSURE

Popular methods nowadays of making patterned polymer films are micro-fabrication techniques such as spin-coating and lithography. While being straight forward and simple, these methods generate polymer films that are usually weak in chemical resistant: for example, they can be easily dissolved by common organic solvents, resulting in defects and damages in the film.

One possible solution to improve such resistance is the development of polymer brushes, that is, grafting polymer chains to substrate surfaces via covalent bonds. Because of this, polymer brushes have become an active area of research and gained interest in applications such as biosensors, cytoskeleton support, and targeted biomolecular bindings. However, this chemical approach has limited capability in growing polymer films in patterned manner.

Most common attempts to grow patterned polymer brushes is to first pattern the SAM, an active compound that can bond to the substrate surface and act as the initiator for the subsequent polymerization. One way to make patterned SAM on surfaces is using dip-pen lithography, which can be precise yet time-consuming and thus less industrial-friendly. Another way is to utilize lithographic techniques, where the substrate surface is masked by patterned resist, and then subjected to vapor deposition of the initiators into the patterned framework. While this method is more applicable to the current industrial setup, creating well-defined, high-resolution patterns can be difficult. Reported methods that produced high-resolution patterned brushes rely on inducing thermodynamically driven polymer aggregation by growing another immiscible polymer brushes at the remaining surface area. Even so, this approach will result in a surface filled with immobilized polymer brushes, which is unfavorable for further microfabrication processing since etch-selectivity and debris removal can be tough.

Polymer brushes are typically polymer chains with one end anchored via stable covalent bonds to a substrate, such as silica. While polymer brushes have been an active research area for some years, precise control of the area-selective formation of these brushes remains a challenge, especially when nanoscale resolution is required. As such, there is growing interest in integrating lithographic techniques with polymer brush synthesis. Applications such as directed cell growth, substrates for cell-membrane derived sheets, thermoresponsive surfaces, and antibody biosensors have been developed in the past using patterned brushes with sub-micron structures.

In general, there are two approaches in generating patterned polymer brushes: the "top-down" approach, where the polymer brushes are grown homogeneously on the surface and then selectively removed to form a pattern; and the "bottom-up" approach, where a patterned self-assembled initiator monolayer is formed as the site for subsequent surface-initiated polymerization. While the "top-down" approach is more straightforward and uncomplicated in terms of chemical processing, it has several disadvantages, such as post-processing residue, surface defects, and over-etching. On the other hand, "bottom-up" approaches are usually associated with complications in terms of chemical compatibility and processing, since it involves a layer of patterned resist which forms the template that limits self-assembled monolayer (SAM) formation to a specific region. It is worth noting the fundamental characteristics of nanopatterned polymer brushes (NPB) are different from those of homogenous brush layers and micropatterned brushes since the NPB's polymer contour length now becomes comparable to pattern size.

SUMMARY OF THE DISCLOSURE

In an aspect, a device of the present disclosure comprises a substrate; and a plurality of polymer nanostructures disposed (e.g., formed or the like) on at least a portion of, substantially all, or all of a surface of the substrate. In various examples, the polymer nanostructures are arranged in a pre-determined pattern and/or are self supporting. In various examples, the substrate is a non-conducting substrate, a semi-conducting substrate, a conducting substrate, or the like. In various examples, the substrate comprises (or is) a layer of a non-conducting material, a semi-conducting material, or a conducting material. In various examples, the polymer nanostructures comprise (or are each) one or more polypeptide group(s) or the like. In various examples, at least a portion or all of the polymer nanostructures comprise end groups (e.g., uniform end groups). In various examples, the uniform end groups comprise fluorescent end groups or the like. In various examples, the fluorescent end groups independently comprise (or are, independently) a rhodamine B group, a tetraphenylethene group, a fluorescein group, a tryptophan group, a tyrosine group, a triphenylamine group, or the like. In various examples, the substrate further comprises second polymer nanostructures disposed on (e.g., formed or the like) at least a portion of, substantially all, or all of the substrate that does not comprise the first polymer nanostructures. In various examples, the device comprises an energy harvesting device, a pressure sensor (such, as for example, a flexible pressure or the like), a sensor (such as, for example, a volatile organic compound (VOC) sensor, a biosensor, or the like). In various examples, the device is an electronic device. In various examples, the device comprises an organic electronic device or a biological simulation model.

In an aspect, a method of making a device of the present disclosure comprises forming a layer of patterned photoresist disposed on at least a portion of the substrate comprising a pattern of first openings through the layer of photoresist; depositing one or more initiator(s) on at least a portion or at least some on of the first openings; contacting the substrate with one or more monomer(s), wherein the polymer nanostructures are formed; and optionally, removing the photoresist. In various examples, the polymerization comprises (or is) a surface-initiated polymerization. In various examples, the polymerization comprises (or is) a ring-opening polymerization, an atom transfer radical polymerization (SI-ATRPs), Cu(0) mediated controlled radical polymerization (SI-CuCRP)s, or the like, or any combination thereof. In various examples, the method further comprising modifying at least a portion of or all of the end groups of the polymer nanostructures. In various examples, the method further comprising forming second polymer nanostructures disposed on at least a portion of the substrate that does not comprise the first polymer nanostructures. In various examples, the method further comprises contacting the polymer nanostructures with one or more solvent(s).

In an aspect, a system of the present disclosure comprises one or more device(s) of the present disclosure; one or more detector(s); and a housing comprising a sample receiving area. In various examples, the one or more detector(s) are positioned in, partially within, external to, or the like, the housing to detect the sample disposed at the sample receiving area. In various examples, the housing further comprises a fluid inlet and a fluid outlet or a gas inlet and a gas outlet. In various examples, the fluid inlet or the gas inlet and the fluid outlet or gas outlet selectively operable to control a fluidic environment or a gas environment within the housing. In various examples, the system further comprises a pump disposed upstream of the fluid inlet or disposed downstream of the fluid outlet. In various examples, the fluid conveyed by the system comprises a gas. In various examples, the one or more detector(s) comprises (or are) a scanning electron microscope, an atomic force microscope, an ellipsometer, an optical reflectometer, a fluorescence detector, or the like, or any combination thereof. In various examples, the system further comprises a display, a camera, a computer, a communication device, or a non-transitory storage medium, or the like, or any combination thereof, to respectively display, record, process, communicate, store, or the like, or any combination thereof, an output of the one or more detectors.

In an aspect, a method of determining a presence or an absence of one or more analyte(s) or a concentration of one or more analyte(s) in a sample comprises contacting one or more composition(s) or device(s) of the present disclosure with the sample; and determining one or more change(s) or an absence of one or more change(s) in at least a portion of or all of the polymer nanostructures of one or more or all of the composition(s) or device(s). In various examples, the change(s) indicate the presence or the absence of the analyte(s) or correlate to the concentration of the analyte(s) in a sample. In various examples, at least a portion of or all of the polymer nanostructure(s) of the composition(s) or device(s) independently comprise an acrylate polymer group, a polypeptide group, or the like. In various examples, the polypeptide group is chosen from poly(γ-benzyl L-glutamate) (PBLG) groups, poly(γ-benzyl D-glutamate) groups, poly(β-benzyl-l-aspartate) (PBLA) groups, poly(γ-methyl-L-glutamate) (PMLLG) groups, poly(β-phenethyl-L-aspartate) groups, and the like, and any combination thereof. In various examples, the polypeptide group comprises (or is) an intrinsically fluorescent polypeptide group, or the like. In various examples, the intrinsically fluorescent polypeptide group is chosen from poly(L-tryptophan) groups, poly(L-tryptophan)-b-PBLG groups, poly(L-phenylalanine) groups, and the like. In various examples, the sample is a gas sample, a liquid sample, or the like. In various examples, the sample is chosen from ambient air samples, industrial process samples, ventilation system samples, laboratory samples, and the like. In various examples, the analyte(s) is/are chosen from volatile organic compounds, and the like, and any combination thereof. In various examples, the volatile organic compound(s) is/are chosen from heteroatom organic compounds, aromatic compounds, halogenated organic compounds, and the like, and any combination thereof. In various examples, the heteroatom compounds are chosen from tetrahydrofuran, ethyl acetate, dimethylformamide, dimethyl sulfoxide, and the like and/or aromatic compounds are chosen from benzene, alkylbenzenes (such as, for example, toluene, xylenes, ethyl benzene, and the like) and any combination thereof and/or the halogenated compounds are chosen from chloroform, methylene chloride, carbon tetrachloride, chlorobenzene, and the like, and any combination thereof. In various examples, the change(s) is/are chosen from morphology changes, thickness changes, surface roughness changes (e.g., a surface roughness decrease), film color changes, fluorescence changes, polarization changes, and the like, and any combination thereof. In various examples, the concentration of the individual analyte(s) in the sample is 5 ppm to 100%, including all integer ppm values and ranges therebetween. In various examples, the at least a portion or all of the polymer nanostructures are in a quenched state prior to contact with the sample. In various examples, the presence or the absence of two or more analytes or the concentration of two or more analytes in the sample is determined in parallel.

BRIEF DESCRIPTION OF THE FIGURES

For a fuller understanding of the nature and objects of the disclosure, reference should be made to the following detailed description taken in conjunction with the accompanying figures.

FIG. 1A depicts the surface comprising a silicon wafer substrate with an e-beam resist film with an example resist thickness of approximately 150 nm. EBL is used to create a pattern on the resist film, as depicted in FIG. 1B. The resist film is used to mask initiator deposition, as depicted in FIG. 1C. After polymerization and resist film removal, FIG. 1D depicts the formation of nanopatterned brushes on the surface.

FIGS. 2A-2H depict a method for the formation of nanopatterned brushes on a surface. A substrate, such as a silicon wafer substrate is cleaned (FIG. 2A). The substrate has a resist film applied by spin-coating (FIG. 2B). The surface (i.e., the combination of the substrate and the resist film) is patterned by EBL (FIG. 2C). An initiator is deposited onto the patterned surface as part of the vapor phase (FIG. 2D). The surface is cleaned to remove the resist film (FIG. 2E). Nanopatterned brushes are grown on the areas of the surface with the deposited initiator (FIG. 2F). Optionally, a second initiator is deposited on the surface as part of the solution/vapor phase (FIG. 2G). A second set of nanopatterned brushes are grown on the areas of the surface with the second deposited initiator (FIG. 2H).

FIG. 7B summarizes results for each of the selected solvents.

FIG. 11A is a SEM image depicting quenched brushes and FIG. 11B is a SEM image depicting collapsed brushes.

FIGS. 16A-16D illustrate brushes fabricated with dot-like EBL patterns with the center-to-center distance held at 200 nm. FIG. 16A is a SEM image of PBLG brush with an approximate diameter of 60 nm. FIG. 16B depicts AFM images corresponding to the SEM image of FIG. 16A. FIG. 16C is a SEM image of PS brushes with inner circle diameters of approximately 70 nm and outer circle diameters of approximately 160 nm. FIG. 16D is a SEM image of PBLG brushes with an approximate diameter of 100 nm with inhomogeneous aggregation. FIG. 16E depicts SEM images of focused ion beam ("FIB") processing for cross-sectional analysis. FIG. 16F is a SEM cross-sectional image of PBLG brushes.

(FIG. 18A) Subsequently, the cleaned sample was loaded into the machine, and a selected area with patterned PBLG brushes was coated with a thin layer of platinum ("Pt") (around 1 μm (m=micometer(s)) via the built-in electron-beam deposition function in the instrument. The sample was then tilted at 520 and was etched by FIB with a beam current of 30 keV. Afterwards, the surface was polished by FIB with beam current of 5 keV. The entire process was monitored using electron beam imaging from a top-down view angle with a voltage of 5 kV. The PBLG brushes' cross section was then closely observed with an increased voltage of 10 kV for better image quality, and the figures were exported for further analyzation. FIG. 18B is an image of the scratched binary patterned sample used for comparison analysis. FIG. 18C depicts the cross-sectional analysis via FIB.

FIG. 19A depicts a configuration where the spectrometer and reflectometer are combined as one detector on top of the housing. FIG. 19B depicts a compact sensor system design for better portability. FIG. 19C depicts a sensor system comprising a camera for direct observation of visible film changes. FIG. 19D depicts a sensor system comprising a viewing window, which may be used in place of a camera. FIG. 19E depicts a sensor system comprising an ellipsometer replacing a reflectometer to obtain additional polarization properties that polymer nanostructures, such as, for example, PBLG and the like, can potentially exhibit.

DETAILED DESCRIPTION OF THE DISCLOSURE

Figures 1A, 1B, 1C, 1D:
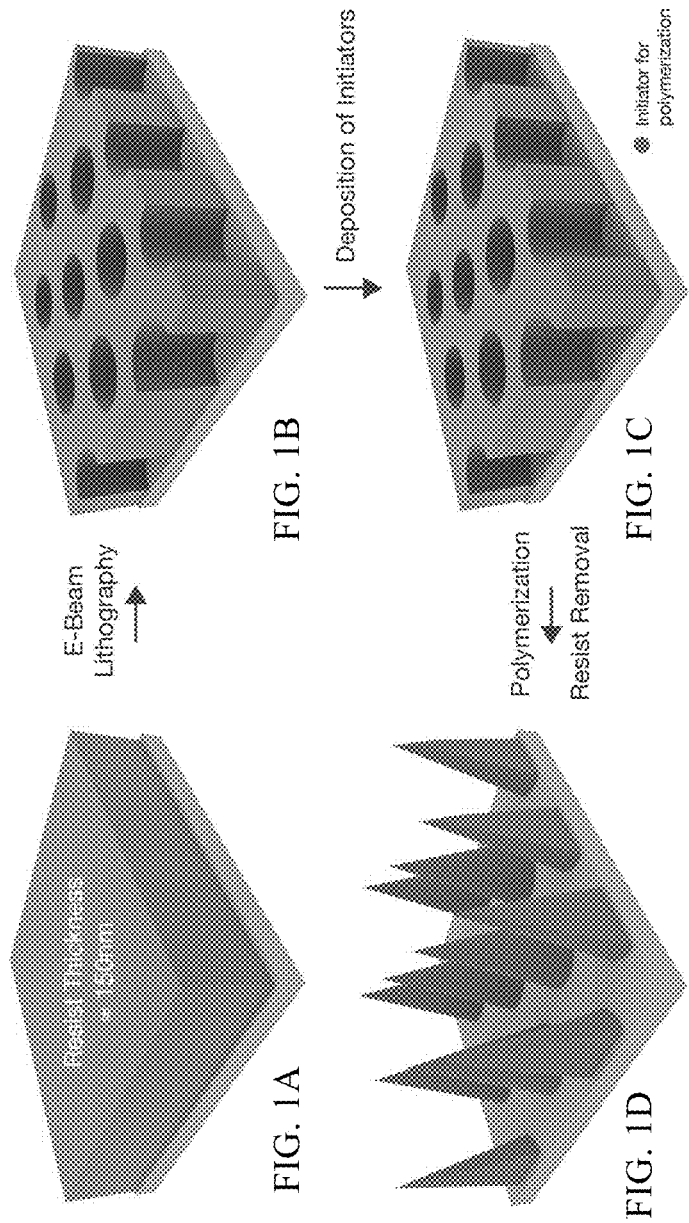
FIGS. 1A-1D depict the formation of nanopatterned brushes on a surface using electron beam lithography ("EBL").

Although subject matter of the present disclosure is described in terms of certain embodiments and examples, other embodiments and examples, including embodiments and examples that do not provide all of the benefits and features set forth herein, are also within the scope of this disclosure. For example, various structural, logical, and process step changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value) of a range. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also, unless otherwise stated, include individual values (e.g., about 1%, about 2%, about 3%, about 4%, etc.) and the sub-ranges (e.g., about 0.5% to about 1.1%, about 0.5% to about 2.4%, about 0.5% to about 3.2%, about 0.5% to about 4.4%, and other possible sub-ranges) within the indicated range. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about, it will be understood that the particular value forms a further disclosure. For example, if the value "about 10" is disclosed, then "10" is also disclosed.

As used herein, unless otherwise indicated, "about" or "the like", when used in connection with a measurable variable (such as, for example, a parameter, an amount, a temporal duration, or the like) or a list of alternatives, is meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations and variations in the alternatives are appropriate to perform in the instant disclosure. As used herein, the terms "about" may mean that the amount or value in question is the exact value or a value that provides equivalent results or effects as recited in the claims or taught herein. That is, it is understood that amounts, sizes, compositions, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, composition, parameter, or other quantity or characteristic, or alternative is "about" or "the like," whether or not expressly stated to be such. It is understood that where "about," is used before a quantitative value, the parameter also includes the specific quantitative value itself, unless specifically stated otherwise.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent radicals, trivalent radicals, and the like). Illustrative examples of groups include:

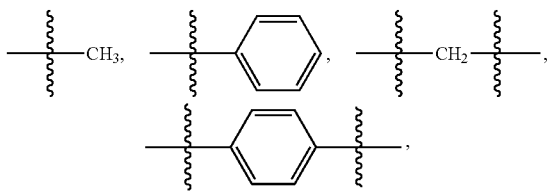

and the like.

The present disclosure provides, inter alia, compositions and methods of making compositions. The present disclosure also provides devices comprising a composition of the disclosure and systems comprising a composition and/or a device of the present disclosure. The present disclosure also provides methods of using the devices and the systems.

The present disclosure relates to, inter alia, the formation of polymer nanostructures (e.g., high resolution (sub-50 nm) polymer nanostructures) on a chemically modified substrate surface. In various examples, the present disclosure describes preparing a patterned self-assembly monolayer (SAM) via nano-lithographic technique followed by surface-initiated synthesis of rod-like polymer brushes on the patterned SAM. In various example, the present disclosure provides methods of solvent quenching process to direct vertical alignment and/or aggregation of polymer brushes, resulting in polymer nanostructures.

In various examples, the present disclosure provides methods that can form high-resolution, well defined polymer brushes via lithography techniques without the necessity of growing the second brushes. In various examples, a method comprises (a) the use of high-resolution lithographic technique; (b) preparation of a patterned SAM as initiator; (c) surface-initiation synthesis of polymer brushes; (d) solvent treatment process to induce polymer self-aggregation.

In an aspect, the present disclosure provides compositions. In various examples, compositions comprise a plurality of polymer nanostructures. In various examples, the polymer nanostructures are self supporting. In various examples, the polymer nanostructures are arranged in a pre-determined pattern. In various examples, a composition is a device (e.g., a device as described herein). In various examples, a composition is made by a method of the present disclosure. Non-limiting examples of compositions are provided herein.

In various examples, a composition comprises a substrate and a plurality of polymer nanostructures (which may be polymer brushes) (which may be referred to in the alternative as brushes or nanospikes first polymer nanostructures) disposed an at least a portion (or all) of a surface of a substrate (e.g., an exterior surface of the substrate or the like). In various examples, the polymer nanostructures are arranged in a pre-determined pattern. In various examples, at least a portion of, substantially all, or all of the polymer nanostructures are rod-like polymer nanostructures, helical polymer nanostructures, or the like, or any combination thereof. In various examples, at least a portion of, substantially all, or all of the polymer nanostructures are a film comprising the polymer nanostructures.

In various examples, at least a portion of, substantially all, or all of the polymer nanostructures comprise a dimension of about 150 nanometers (nm) or less (e.g., about 150 nm to about 1 nm, including all nm values and ranges therebetween). In various examples, the polymer nanostructures comprise a dimension about 50 nm or less (e.g., about 50 nm to about 1 nm, including all nm values and ranges therebetween).

In various examples, at least a portion of, substantially all, or all of the polymer nanostructures comprise a linear dimension parallel to the surface of the substrate on which the polymer nanostructures are disposed of about 150 nanometers (nm) or less (e.g., about 150 nm to about 1 nm, including all nm values and ranges therebetween). In various examples, at least a portion of, substantially all, or all of the polymer nanostructures comprise a linear dimension parallel to the surface of the substrate on which the polymer nanostructures are disposed of about 50 nm or less (e.g., about 50 nm to about 1 nm, including all nm values and ranges therebetween).

In various examples, at least a portion of, substantially all, or all of the polymer nanostructures are (e.g., the polymer nanostructures comprise an axis, which may be longest longitudinal axis, that is) aligned substantially perpendicular or substantially perpendicular to the surface of the substrate on which the polymer nanostructures are disposed. In various examples, the polymer nanostructures have a height (e.g., the polymer nanostructures comprise an axis, which may be longest longitudinal axis that are aligned substantially perpendicular or perpendicular to the surface of the substrate on which the polymer nanostructures are disposed and have a length of) 200 nm or less.

In various examples, at least a portion of, substantially all, or all of the polymer nanostructures comprise a tilt axis, which is a longest longitudinal axis of a polymer nanostructure. In various examples, at least a portion of, substantially all, or all of the polymer nanostructures comprise a tilt axis that is +/−20 degrees or less (e.g., 15 degrees or less, 10 degrees or less, 5 degrees or less or 20 degrees to 0 degrees, including all 0.1 degree values and ranges therebetween) from an axis substantially perpendicular or perpendicular to the substrate, that is aligned substantially perpendicular or perpendicular to the substrate. In various examples, the polymer nanostructures are free-standing (e.g., they are self supporting or unsupported). In various examples, the polymer nanostructures are not supported by other (exogenous) polymer nanostructures, a polymer, or the like).

In various examples, at least a portion of, substantially all, or all of the polymer nanostructures have a center-to-center distance of about 200 nm. In various examples the ratio of center-to-center distance to the length of an axis parallel to the surface of the substrate on which the polymer nanostructures are disposed is center is about 4 to about 1 to about 2 to 1, including all 0.1 ratio values and ranges therebetween.

In various example, a polymer nanostructure (e.g., a first polymer nanostructure or a second polymer nanostructure) comprises a hydrocarbon polymer, a polypeptide, or the like. In various examples, at least a portion of, substantially all, or all of the polymer nanostructures are cone shaped or the like (e.g., the polymer nanostructures comprise an exterior surface defining an axis, which may be longest longitudinal axis) that is not aligned substantially perpendicular or perpendicular to the surface of the substrate on which the polymer nanostructures are disposed).

Figure 5:
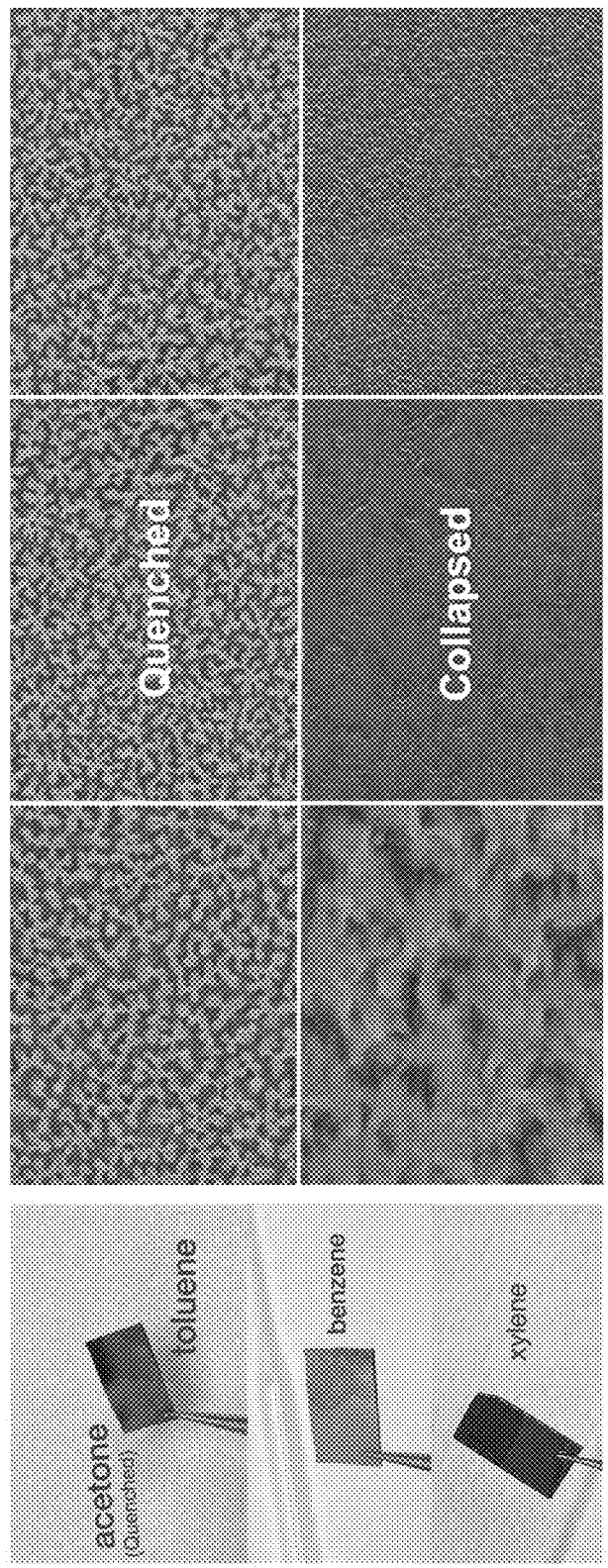
FIG. 5A is an image depicting an immediate change in color of a polymer film with nanopatterned brushes after contact with the selected solvent.
FIG. 5B is a scanning electron microscopy ("SEM") image of the polymer film in a quenched state (upper image) and a collapsed state (lower image) after contact with benzene.
FIG. 5C is a SEM image of the polymer film in a quenched state (upper image) and a collapsed state (lower image) after contact with toluene.
FIG. 5D is a SEM image of the polymer film in a quenched state (upper image) and a collapsed state (lower image) after contact with xylene.

In various examples, at least a portion of, substantially all, or all of the polymer nanostructures have a flat morphology, a bumpy morphology, a spiky morphology, or the like, or any combination thereof. Non-limiting examples of morphologies are shown in FIGS. 5B-D.

In various examples, at least a portion of, substantially all, or all of the polymer nanostructures exhibit liquid crystal behavior, piezoelectric behavior, or the like.

In various examples, polymer nanostructures are covalently bonded to the substrate. In various examples, the polymer nanostructures are grafted to substrate.

In various examples, at least a portion of, substantially all, or all of the polymer nanostructures are not connected to an adjacent polymer nanostructure (e.g., are not bridged to another polymer nanostructure). In various example, connection of adjacent nanostructures is observed by electron microscopy (such as, for example, scanning electron microscopy or the like).

Polymer nanostructures can be arranged in various pre-determined patterns. In various examples, a predetermined pattern is continuous or discontinuous. A pre-determined pattern can comprise various shapes. In various examples, a predetermined pattern comprises substantially the same (or the same) shapes. In various examples, a predetermined pattern comprises two or more different shapes. In various examples, a predetermined pattern is continuous or discontinuous. In various examples, a predetermined pattern comprises one or more array(s). In various examples, an array comprises substantially the same (or the same) polymer nanostructure(s) or two or more structurally distinct or chemically distinct polymer nanostructures.

Various substrates can be used. In various examples, a substrate (e.g., all of the substrate, the exterior surface of the substrate, or the like) is non-conducting (such as, for example, silicon dioxide, aluminum oxide, or the like) or conducting (such as for example, a semiconductor (such as, for example, silicon or the like), a metal (e.g., gold, silver, or the like), metal alloy, or the like). In various examples, the substrate comprises (or is) a layer of a non-conducting material, a semi-conducting material, or a conducting material.

A composition (e.g., a substrate) can comprise various polymer nanostructures. A polymer nanostructure can comprise any polymer that can be polymerized by a method of the present disclosure. In various examples a polymer nanostructure (e.g., a first polymer nanostructure or a second polymer nanostructure) comprises a polymer formed ring-opening polymerization, atom transfer radical polymerization (SI-ATRP), Cu(0) mediated controlled radical polymerization (SI-CuCRP), or the like, or any combination thereof. In various examples a polymer nanostructure (e.g., a first polymer nanostructure or a second polymer nanostructure) comprises a hydrocarbon polymer, a polypeptide, or the like. In various example, a polymer nanostructure (e.g., a first polymer nanostructure or a second polymer nanostructure) comprises a hydrocarbon polymer, a polypeptide, or the like.

In various examples, a polymer nanostructure comprises one or more polypeptide(s) or the like. In various examples, the polypeptide group is chosen from poly(γ-benzyl L-glutamate) (PBLG), poly(γ-benzyl D-glutamate), poly(β-benzyl-l-aspartate) (PBLA), poly(γ-methyl-L-glutamate) (PMLG), poly(β-phenethyl-L-aspartate), and the like, and any combination thereof. In various examples, a polymer nanostructure comprises one or more polypeptide group(s). In various examples, a polypeptide group is chosen from poly(γ-benzyl L-glutamate) (PBLG) groups, poly(γ-benzyl D-glutamate) groups, poly(β-benzyl-l-aspartate) (PBLA) groups, poly(γ-methyl-L-glutamate) (PMLG) groups, poly(β-phenethyl-L-aspartate) groups, and the like, and any combination thereof.

In various examples, a polypeptide group comprises (or is) an intrinsically fluorescent polypeptide group, or the like. In various examples, the intrinsically fluorescent polypeptide group is chosen from poly(L-tryptophan) groups, poly(L-tryptophan)-b-PBLG groups, poly(L-phenylalanine) groups, and the like.

In various examples, at least a portion or all of the polymer nanostructures comprise uniform end groups (e.g., polymer nanostructure end groups opposite the surface of the substrate on which an end of the polymer nanostructure(s) are disposed). In various examples, the polymer nanostructure end groups are uniform in terms of one or more or all of chemical group (which may be a functional group), polymer end group distance from the opposite end of the polymer nanostructures, or the like.

Figure 3:
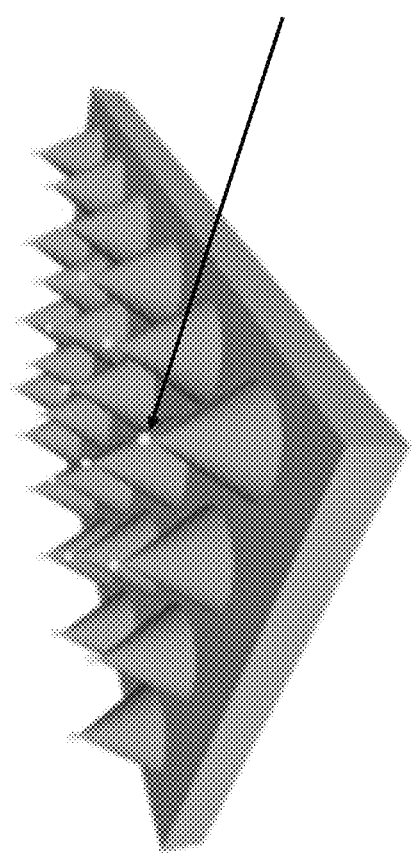
FIG. 3 depicts the substrate as a biological-type model with a virus-like substrate. With uniform end-group functionality and submicron spacing, the substrate superficially resembles the capsid and antigen structure of several types of viruses, which are responsible for cell recognition and invasion and antibody recognition. Spacing and feature sizes of the nanospikes are in the range of 10 nm. Techniques are used to chemically change the amine-end to the active functional groups (indicated as spheres in the figure with an arrow pointing to an example) that are similar to the ones on virus capsid and antigens.

In various examples, at least a portion of, substantially all, or all the polymer nanostructure end groups are functionalized (e.g., a functionalized polymer end group is indicated by the arrow). Examples of such polymer nanostructures are shown in FIG. 3 where the arrow indicates a functionalized polymer end group. In various examples, at least a portion of or all the polymer nanostructure end groups are functional end groups similar to a virus capsid, antigen, or like, or any combination thereof.

In various examples, the end groups (which may be uniform) comprise fluorescent end groups or the like. In various examples, the fluorescent end groups independently comprise (or are, independently) a rhodamine B group, a tetraphenylethene group, a fluorescein group, a tryptophan group, a tyrosine group, a triphenylamine group, or the like. In various examples, a fluorescent end group is formed from (e.g., by conjugation of a fluorescent compound to a reactive functional end group of a polymer nanostructure) rhodamine B, tetraphenylethene, fluorescein, tryptophan, tyrosine, triphenylamine, or the like.

In various examples, a substrate further comprises second polymer nanostructures disposed on at least a portion of, substantially all, or all of the substrate that does not comprise the first polymer nanostructures. In various examples, the second polymer nanostructures provide function different from the first polymer nanostructure.

In various examples, at least a portion of, substantially all, or all of the interstitial space between is filled with a polymer or polymer nanostructures (e.g., swellable polymer nanostructures or the like). In various examples, the polymer is or the polymer nanostructures are swelled or the like. This is shown in FIGS. 4A and 4B.

In various examples, a composition is configured for (or suitable for) use in energy harvesting, flexible pressure sensors, biosensors, or the like, or a combination thereof. In various examples, a substrate is configured for (or suitable for) use in surface modification, in micro/nanofabrication, as a sensor/sensor(s), as an actuator/actuator(s), liquid crystal thin film, biological (e.g., cell, virus, or the like, or a combination thereof) simulation model, or the like, or a combination thereof.

In an aspect, the present disclosure provides devices. The devices comprise one or composition(s) of the present disclosure. In various examples, a device comprises one or more feature(s) described above with respect to the compositions of the present disclosure. In various examples, a device is made by a method of the present disclosure. Non-limiting examples of devices are provided herein.

In various examples, a device comprises one or more substrate(s) comprising polymer nanostructures of the present disclosure. In various examples, the device is an energy harvesting device, a flexible pressure sensor, a biosensor, or the like. In various examples, a device is an electronic device (e.g., a piezoelectric device, an actuator, or the like). In various examples, a device is an organic electronic device (e.g., a liquid crystal thin film device). In various examples, a device is a biological (e.g., cell simulation, virus simulation, or the like, or a combination thereof) simulation model. In various examples, a device is a template (e.g., a template for nanoparticle assembly). In various examples, a device is configured for (or suitable for) use in energy harvesting, flexible pressure sensors, biosensors, or the like.

In various examples, a device is a thin film device. In various examples, a device is organic electronic device (e.g., a liquid crystal thin film device or the like) or the like.

In various examples, a device is configured for (or suitable for) use in surface modification, in micro/nanofabrication, as a sensor/sensor(s), as an actuator/actuator(s), biological (e.g., cell, virus, or the like, or a combination thereof) simulation model, or the like, or a combination thereof.

In an aspect, the present disclosure provides methods of making compositions and devices. Non-limiting examples of compositions are provided herein (e.g., in the draft sample claims and the Example).

Various non-limiting examples of method of making compositions or devices are shown in FIGS. 2A-2H. In various examples, (1) substrate cleaning, (5) sample cleaning, (7) deposition of a second initiator(s) are independently optional.

In various examples, a method of making a composition or device comprises forming a layer of patterned photoresist (e.g., positive tone or negative tone photoresist) disposed on at least a portion of, substantially all, or all of an exterior surface of a substrate; depositing initiator(s) on at least a portion of, substantially all, or all of the exterior surface of the substrate on which the photoresist is not disposed; contacting the substrate (e.g., the areas of the substrate comprising the initiator(s)) with one or more monomer(s), wherein the polymer nanostructures are formed; and optionally, removing the photoresist.

In various examples, a method of making a composition or device comprises depositing a layer of photoresist on the at least the portion of the surface of the substrate; patterning the layer of the photoresist via a nanolithographic process to form a pattern of first openings through the layer of photoresist; depositing one or more initiators within at least some of the first openings; depositing one or more monomers on the one or more initiators in the first openings; heating the substrate to polymerize the one or more monomers in the first openings to form the polymer nanostructures in the first openings; and optionally, removing the photoresist. In various examples, a method further comprises patterning the layer of the photoresist via a nanolithographic process to form a pattern of second openings through the layer of photoresist; depositing one or more initiators within at least some of the second openings; depositing one or more monomers on the one or more initiators in the second openings; and heating the substrate to polymerize the one or more monomers in the second openings to form the polymer nanostructures in the second openings.

In various examples, a layer of patterned photoresist is formed using an electron beam photoresist (e.g., positive tone or negative tone photoresist). In various examples, the layer of patterned photo resist is symmetric or asymmetric.

In various examples, initiator(s) is/are deposited by a vapor deposition process. In various examples, monomers(s) is/are deposited by a vapor deposition process. In various examples, initiator(s) and monomers(s) are each deposited by an independent vapor deposition process. In various examples, initiator(s) for a self-assembled monolayer (SAM) disposed on at least a portion of or all of the substrate surface not masked by the photoresist. In various examples, initiator(s) (e.g., self-assembled monolayer of initiator(s)) initiate(s) polymerization of the monomer(s). In various examples, initiator(s) does/do not diffuse through the photoresist (e.g., does/do not diffuse through the photoresist resulting in polymerization in an area of substrate on which the photoresist is disposed). Without intending to be bound by any particular theory, it is considered that an initiator comprising groups such as, for example, at least three carbon groups (e.g., isopropyl groups or the like) do not diffuse through the photoresist layer and initiate polymerization in the area(s) masked by the photoresist.

In various examples, initiator(s) independently comprise(s) an isopropyl group (e.g., 3-aminopropyldiisopropylethoxysilane (APDIPES) or the like). In various examples, initiator(s) is/are not as 3-aminopropyl-triethoxysilane (APTES), 3-aminopropyl-trimethoxysilane (APTMS), or the like. In various examples, the initiator is not 3-aminopropyldimethylethoxysilane (APDMES). In various examples, the initiator(s) are chosen from alkylaminodialkylalkoxysilanes comprising at least one isopropyl group (e.g., 1 or 2 isopropyl groups). In various examples, initiator(s) is/are not solution deposited.

In various example, monomer(s) is/are chosen from acrylates, methacrylates, styrenes, and the like, and any combination thereof. In various examples, monomer(s) is/are amino acid(s). An amino acid can be a canonical amino acid, a non-canonical amino acid, or an analog or derivative thereof. In various example, the monomer(s) is/are functionalized amino acid(s) (e.g., functionalized to react in a desired polymerization reaction (e.g., a ring-opening polymerization or the like) (e.g., amino acid N-carboxyanhydride(s) or the like, which can be polymerized in a ring opening polymerization or the like)). In various examples, monomer(s) is/are of sufficient purity and/or stability to be deposited on the substrate (e.g., by vapor phase deposition or the like).

In various examples, a polymerization is a surface-initiated polymerization (which may be a vapor-phase surface-initiated polymerization or the like). In various examples, a polymerization is chosen from ring-opening polymerizations, atom transfer radical polymerizations (SI-ATRPs), Cu(0) mediated controlled radical polymerizations (SI-CuCRP)s (e.g., wherein at least a portion or all of the initiator(s) comprise an amine end comprising appropriate functional groups), and the like, and any combination thereof. In various examples, nanopatterned polystyrene brushes were formed by a SI-CuCRP. In various examples, nanopatterned PMMA brushes were formed by a SI-ATRP.

In various examples, a method further comprises modifying at least a portion of or all of the end groups of the polymer nanostructures (e.g., polymer nanostructure end groups opposite the surface of the substrate on which an end of the polymer nanostructure(s) are disposed) (which may be amine groups, such as, for example, primary amine groups or the like). The modified end groups may be referred to, in the alternative, as functionalized end groups.

In various examples, modified end groups are suitable for area-selective cell adhesion/differentiation, as a template (e.g., for nanoparticle assembly or the like), imaging (e.g., florescence imaging or the like), or the like, or any combination thereof. In various examples, at least a portion or all of the end groups comprise one or more nanoparticle(s) or the like, or any combination thereof.

In various examples, a method further comprises forming second polymer nanostructures disposed on at least a portion of the substrate that does not comprise the first polymer nanostructures. In various examples, a second polymer nanostructure is a bridging inhibitor.

In various examples, a method further comprises contacting the polymer nanostructures with one or more solvent(s) (which may be referred to, in the alternative, as solvent quenching). Non-limiting examples of solvents include alkane solvents (such as, for example, hexane and the like), alcohols (such as, for example, methanol, ethanol, and the like), and the like.

In various examples, a method comprises forming a pattern of polymer brushes, which may be in a pre-determined pattern, on substrate using nanolithography. In various examples, a pattern of initiator(s) (which initiate polymer brush formation) is formed.

Surface-initiated vapor deposition is a versatile method that was utilized in polymerizing various α-amino acids, for example, to form dense brushes. The table below shows non-limiting examples of compatible monomers and their deposition conditions (Table 1) and their resulting film properties (Table 2).

TABLE 1

Properties and Deposition Conditions (Time and Temperature) of the Poly(amino acids)

| | melting point of NCA (° C.) | deposition time (h) | deposition temp (° C.) | solvent[a] |
|---|---|---|---|---|
| Class I: Esters | | | | |
| γ-benzyl-L-glutamate | 91-93 | 2 | 105 | DCA/chloroform |
| γ-methyl-L-glutamate | 94-98 | 2 | 110 | DCA/chloroform |
| β-benzyl-L-aspartate | 126-129 | 3 | 140 | DMF |
| Class II: Heteroatom ($C_\beta$) | | | | |
| O-benzyl-L-serine | 71-73 | 2 | 80 | DCA |
| S-benzyl-L-cysteine | 105-106 | 2.5 | 90 | DCA |
| Class III: Aromatics | | | | |
| O-benzyl-L-tyrosine | 141 | 2.3 | 140 | DMF |
| L-tryptophan | 144-146 | 4.6 | 140 | DMF |
| L-phenylglycine | 124-129 | 2 | 135 | DMSO |
| L-phenylalanine | 88-89 | 2 | 100 | DCA |

TABLE 2

Film Thickness and Conformation of Deposited Polypeptides

| | | % α-helix | | % β-sheet | | |
|---|---|---|---|---|---|---|
| | film thickness (Å) | right-handed | left-handed | parallel | antiparallel | % random |
| Class I: Esters | | | | | | |
| γ-benzyl-L-glutamate | 580 ± 40 | 100 | | | | |
| γ-methyl-L-glutamate | 110 ± 5 | 98 | | | 2 | |
| β-benzyl-L-aspartate | 310 ± 30 | | 85 | 15 | | |
| Class II: Heteroatom ($C_\beta$) | | | | | | |
| O-benzyl-L-serine | 80 ± 10 | | | | 62 | 38 |
| S-benzyl-L-cysteine | 130 ± 5 | | | | 53 | 47 |
| Class III: Aromatics | | | | | | |
| O-benzyl-L-tyrosine | 800 ± 110 | | | 100 | | |
| L-tryptophan | 220 ± 10 | 100 | | | | |
| L-phenylglycine | 50 ± 5 | 72 | | | 28 | |
| L-phenylalanine | 80 ± 10 | 37 | | | 25 | 38 |

In various examples, a polymer nanostructure or polymer nanostructure(s) comprise one or more of the amino acid(s) or polypeptides comprising one or more of the amino acid(s) in Table 1 or 2.

In various examples, the monomer(s) is/are provided by a monomer reservoir (e.g., by sublimation of a film, which may be a uniform film, disposed on a surface of the monomer reservoir). In various examples, a film comprising the monomer film is formed from a concentrated solution of the monomer(s). For example, a controlled amount of NCA monomer was added to the aluminum container and dissolved in a few drops of ethyl acetate to form a concentrated solution. The solution was then dried by evaporation without any disturbance, providing a uniform film in the monomer reservoir.

In various examples, a method comprises use of a monomer source (e.g., a monomer reservoir) comprising a metal container and a film (which may be a uniform film that may be formed from a concentrated solution of monomer(s)) disposed on a surface of the metal container.

Figure 4:
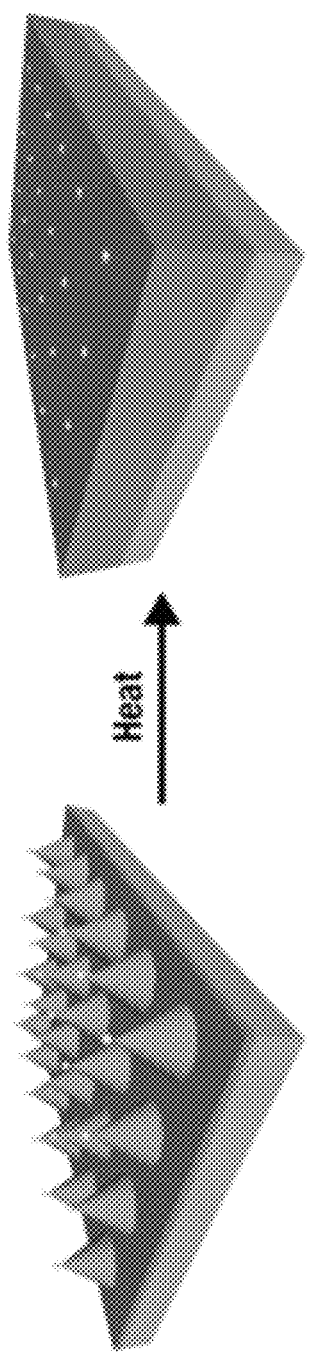
FIGS. 4A-4B depict stimuli-responsive surfaces with dual properties. As depicted in FIG. 4A, a surface with nanospikes can be modified and further processed to form a second brush in the blank area. The swelling of surrounding brushes can be controlled such that the active end-group of the spikes is exposed or buried, as depicted in FIG. 4B. The surface has switchable morphology and hence functionality.

In various examples, a method further comprises swelling (e.g., as shown in FIG. 4) at least a portion of, substantially all, or all of the polymer nanostructures. In various examples, the swelling results in formation of stimuli responsive surface.

In various examples, a method does not comprise use of solvent deposition of the monomer(s). In various examples, a method does not comprise removal (e.g., selective removal) of polymer nanostructures. In various examples, a method does not comprise use of a self-assembled monomer monolayer.

Figure 21:
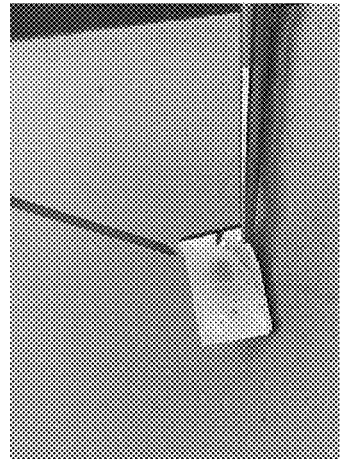
FIG. 21 depicts a film after exposure to the benzene vapor.
Figure 20:
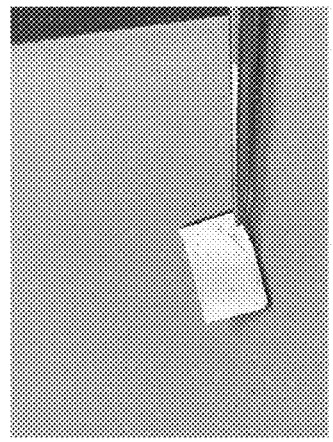
FIG. 20 depicts a film before exposure to the benzene vapor.

In an aspect, the present disclosure provides systems. The systems comprise one or composition(s) or one or more devices of the present disclosure. In various examples, a system comprises one or more or all of the components described in FIGS. 21A and B. Non-limiting examples of systems are provided herein.

In various examples, a system is configured to independently control the temperature of the substrate and the monomer reservoir. In various examples, the monomer reservoir is configured for sublimation of the monomer(s), where there is a temperature differential between the monomer reservoir and the substrate (e.g., the temperature of the substrate is lower than the temperature of the monomer reservoir). In various examples, a substrate is in thermal connection with a condenser configured to provide a desired substrate temperature.

Figure 19A:
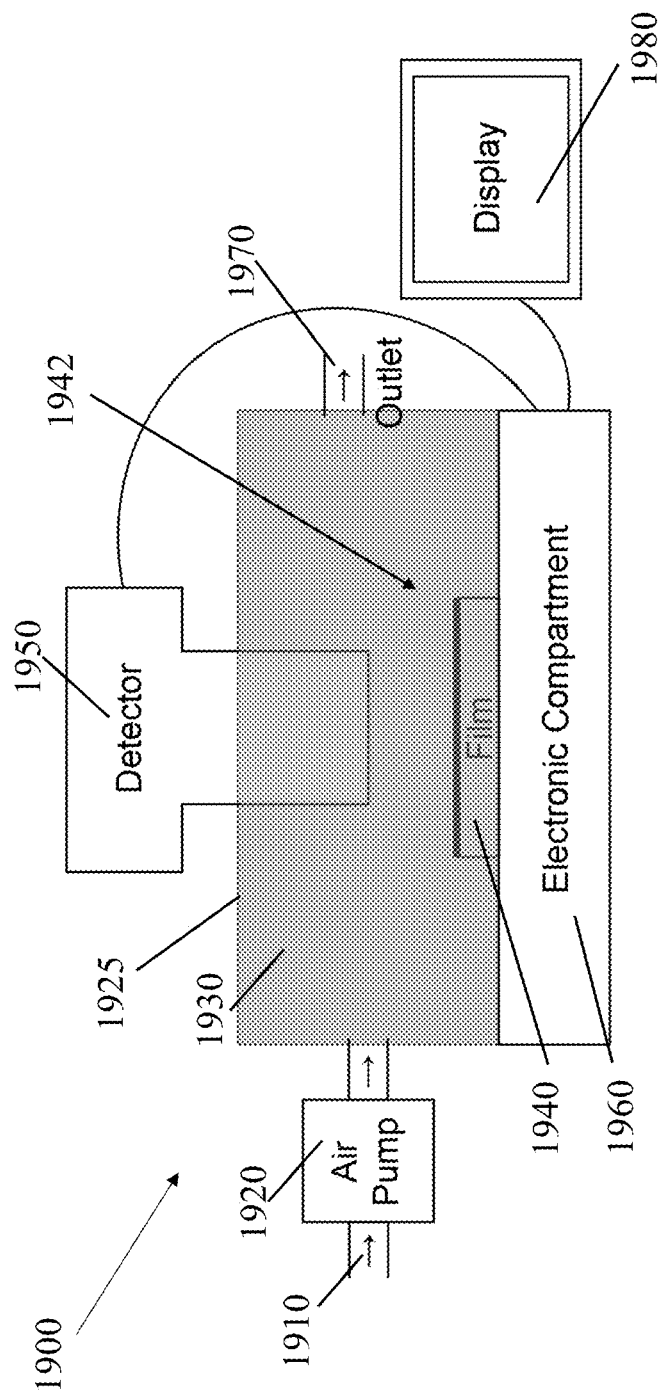
FIGS. 19A-19E depict example sensor system embodiments.

FIG. 19A depicts a first embodiment of a sensing device or a sensor system 1900, in accordance with certain examples. Sensing device 1900 comprises, in various examples, inlet 1910, a flow control device (e.g., a fan, an air pump, etc.) 1920, a housing 1925 defining a chamber 1930 comprising a sample receiving area 2042, composition(s) or device(s) comprising polymer nanostructures (which may be a film) 1940, detector 1950, electronic compartment 1960, outlet 1970, and display 1980. In various examples, inlet 1910 is connected to flow control device 1920. In various examples, inlet 1910 is connected to flow control device 1920 to impart a desired flow rate and/or volume. In various examples, the flow control device 1920 is connected to the outlet 1970 instead of the inlet 1910, also to impart a desired flow rate and volume. Although not shown, in some examples, the flow control device 1920 is connected to a controller and a control system to control the operation of the flow control device 1920. In the example of FIG. 19A, air from the inlet 1910 introduced into the chamber of 1930 of the housing 1925 passes over composition(s) or device(s) comprising polymer nanostructures (which may be a film) 1940 and exits the chamber 1930 via outlet 1970. While inlet 1910 and outlet 1970 are depicted on the left and right sides respectively of sensing device or sensor system 1900, any suitable location(s) may be used to introduce, circulate, and remove air into and out of chamber 1930. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

In various examples, composition(s) or device(s) comprising polymer nanostructures (which may be a film) 1940 comprises polymer nanostructures configured for surface-initiated interaction with compounds within the surrounding air, such as, for example, volatile organic chemicals ("VOCs") or the like. In various examples, detector 1950 comprises a reflectometer and a spectrometer, not depicted, to detect changes (e.g., as described herein) in composition(s) or device(s) comprising polymer nanostructures (which may be a film) 1940 in response to contact with the sample (e.g., air or other conveyed gas, liquid, fluid, or the like). In an example, detector 1950 may detect changes (e.g., as described herein) of composition(s) or device(s) comprising polymer nanostructures (which may be a film) 1940, such as is shown by way of example in FIGS. 5A-5D, FIG. 6, FIGS. 7A-7B, and FIGS. 20 and 21. In various examples, sensing components of detector 1950 are disposed to sense (e.g., image, etc.) the composition(s) or the device(s) comprising polymer nanostructures (which may be a film) 1940 and/or a region adjacent the composition(s) or the device(s) comprising polymer nanostructures (which may be a film) 1940, with electronic components of the detector 1950 being housed in electronic compartment 1960, on-board the detector 1950, and/or external to the detector 1950, either within the housing 1925 or external to the housing. In various examples, the detector 1950 is communicatively coupled to display 1980 directly or indirectly, such as, for example, through an intermediary communication device or the like. In alternate examples, detector 1950 communicates wirelessly with display 1980, such as, for example, via near field communication ("NFC") or other wireless communication technology, such as, for example, Bluetooth, Wi-Fi, infrared, or any other suitable technology. Detector 1950 may comprise, or be operatively associated with, a local or remote processor configured to collect, process, and store data from the sensing components. Processed data is presented on display 1980. Processed data may include example data as depicted in FIGS. 7A-7B. Processed data also includes, for example, detection and/or concentration of specific compounds in the surrounding air, such as, for example, the presence and/or concentration of VOCs. In various examples, display 1980 is an external display to sensing device or sensor system 1900. In alternate examples, display 1980 is integrated with sensing device or sensor system 1900. In some examples, in lieu of, or in addition to the display 1980, the detector 1950 is configured to communicate, directly or indirectly, with a printer or other graphical output device. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

Figure 19B:
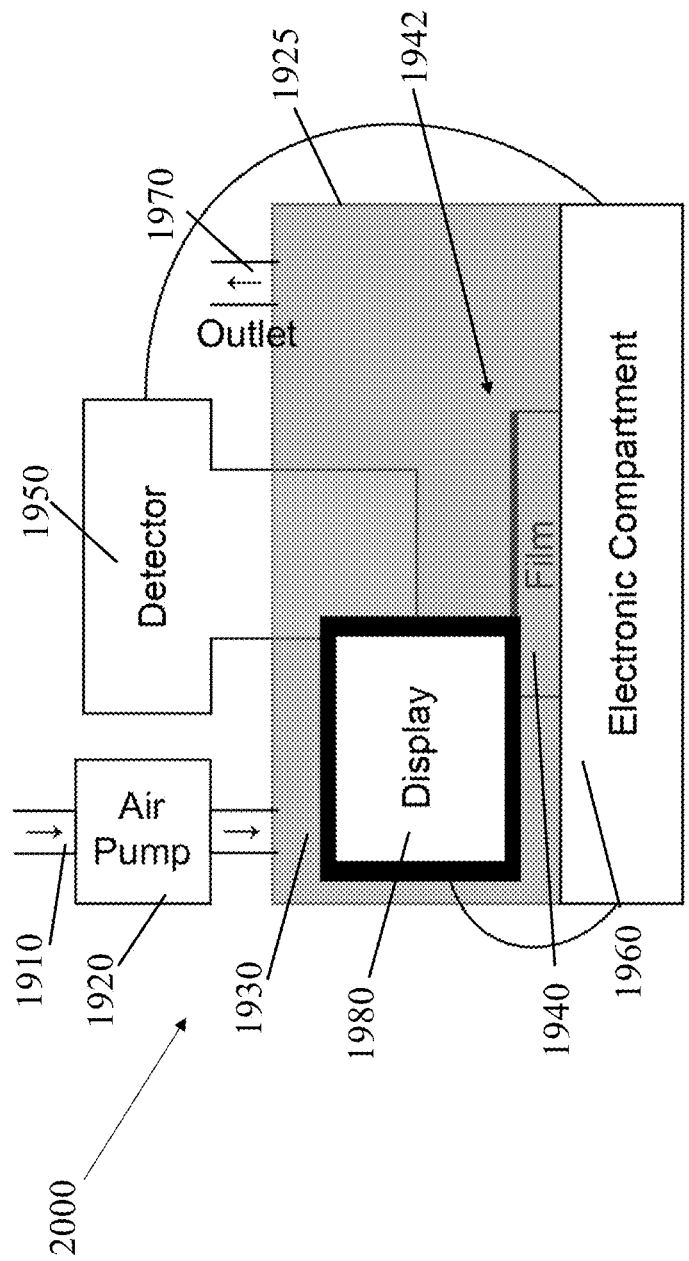

FIG. 19B depicts a second embodiment of a sensing device or a sensor system 2000, in accordance with certain examples. Sensing device 2000 comprises inlet 1910, flow control device 1920 (e.g., fan, air pump, etc.), a housing 1925 defining a chamber 1930 comprising a sample receiving area 1942, composition(s) or device(s) comprising polymer nanostructures (which may be a film) 1940, detector 1950, electronic compartment 1960, outlet 1970, and display 1980, previously described herein with respect to FIG. 19A. In an example, sensing device or sensor system 2000 is a more compact design as compared to sensing device or sensor system 1900. Inlet 1910, flow control device 1920, and outlet 1970 may be located on a top surface of sensing device or sensor system 2000 to reduce the net footprint of the sensor. In various examples, display 1980 is an external display mounted on sensing device 2000. In various alternate examples, display 1980 is integrated with sensing device 2000. In various examples, in lieu of, or in addition to the display 1980, the detector 1950 is configured to communicate, directly or indirectly, with a printer or other graphical output device. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

Figure 19C:
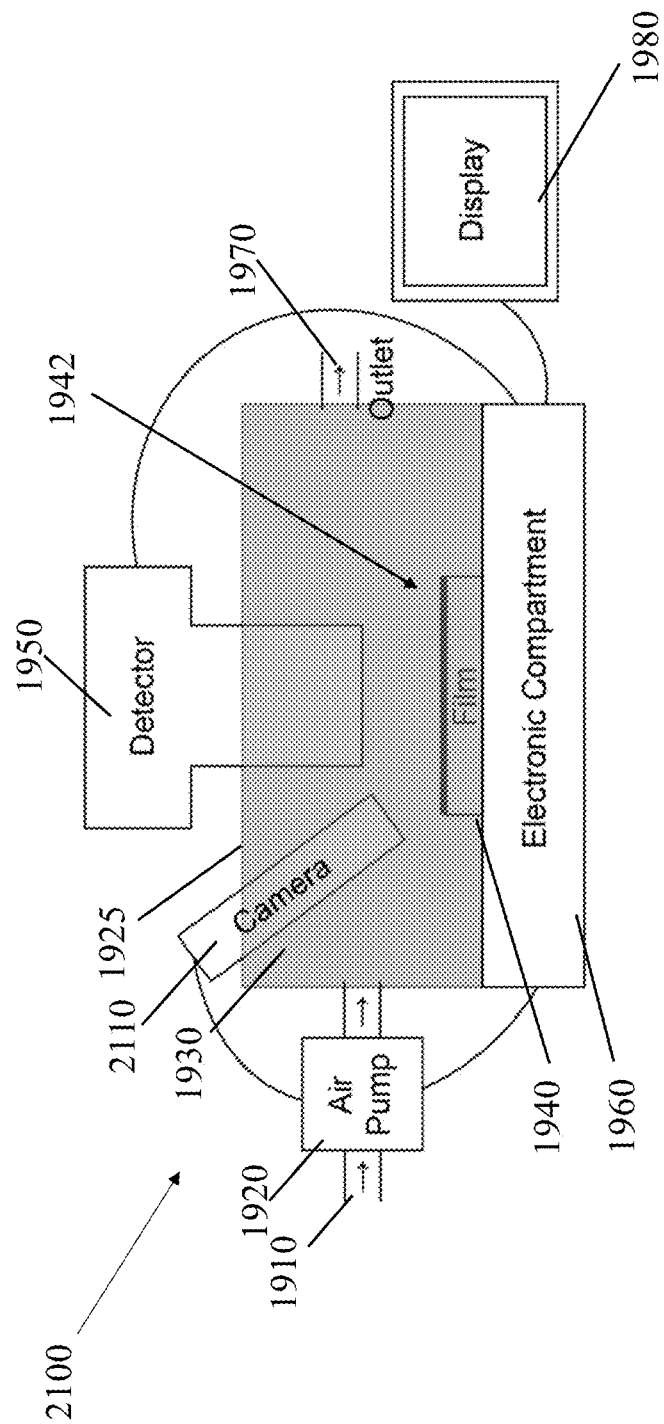

FIG. 19C depicts a third embodiment of a sensing device or a sensor system 2100, in accordance with certain examples. Sensing device 2100 comprises inlet 1910, flow control device 1920, housing 1925 defining chamber 1930 comprising sample receiving area 2042, composition(s) or device(s) comprising polymer nanostructures (which may be a film) 1940, detector 1950, electronic compartment 1960, outlet 1970, display 1980, and camera 2110. Inlet 1910, flow control device 1920 (e.g., fan, air pump, etc.), a housing 1925 defining a chamber 1930 comprising a sample receiving area 1942, film 1940, detector 1950, electronic compartment 1960, outlet 1970, and display 1980 were previously described herein with reference to FIG. 19A. Camera 2110 may be used for direct observation of visible composition(s) or device(s) comprising polymer nanostructures (which may be a film) 1940 changes. In various examples, camera 2110 may be a microscope camera capable of capturing images on a nm scale. Any suitable type of camera or image device technology may be used, including, but not limited to, Charge Coupled Device (CCD), Spectroscopic CCD, electron-multiplying CCD detection systems, or the like. Camera 2110 may be communicatively coupled to detector 1950 and/or display 1980. In various alternate examples, camera 2110 may communicate wirelessly with detector 1950 and/or display 1980, such as, for example, via near field communication ("NFC") or other wireless communication technology, such as Bluetooth, Wi-Fi, infrared, or any other suitable technology. In an example, images from camera 2110 may be displayed in real time on display 1980. In various examples, in lieu of, or in addition to the display 1980, the detector 1950 is configured to communicate, directly or indirectly, with a printer or other graphical output device. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

Figure 19D:
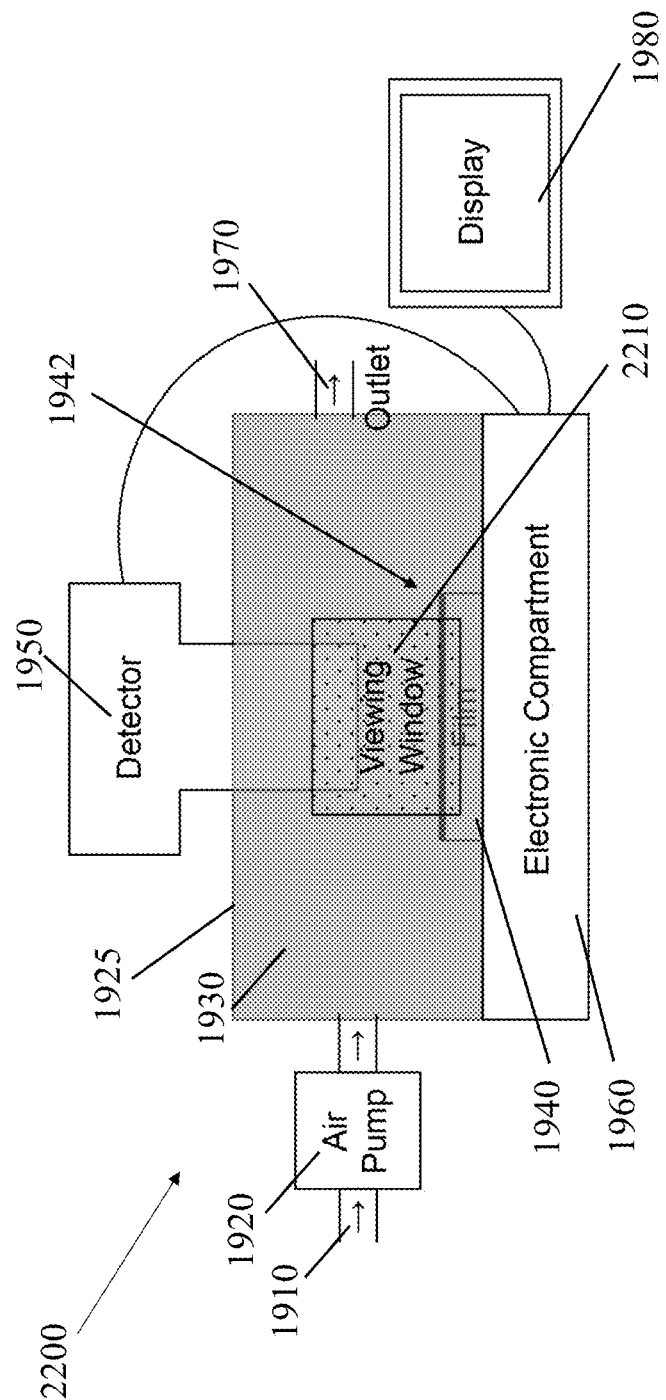

FIG. 19D depicts a fourth embodiment of a sensing device or a sensor system 2200, in accordance with certain examples. Sensing device or a sensor system 2200 comprises inlet 1910, flow control device 1920 (e.g., fan, air pump, etc.), housing 1925 defining a chamber 1930 comprising a sample receiving area 1942, composition(s) or device(s) comprising polymer nanostructures (which may be a film) 1940, detector 1950, electronic compartment 1960, outlet 1970, display 1980, and viewing window 2210. Inlet 1910, flow control device 1920, housing 1925 defining a chamber 1930 comprising a sample receiving area 1942, composition(s) or device(s) comprising polymer nanostructures (which may be a film) 1940, detector 1950, electronic compartment 1960, outlet 1970, and display 1980 were previously described herein with reference to FIG. 19A. Sensing device or sensor system 2200 may comprise viewing window 2210 in place of camera 2110, previously described herein with reference to FIG. 19C. Viewing window 2210 may allow users to monitor changes (e.g., as described herein) to composition(s) or device(s) comprising polymer nanostructures (which may be a film) 1940. In various examples, in lieu of, or in addition to the display 1980, the detector 1950 is configured to communicate, directly or indirectly, with a printer or other graphical output device. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

Figure 19E:
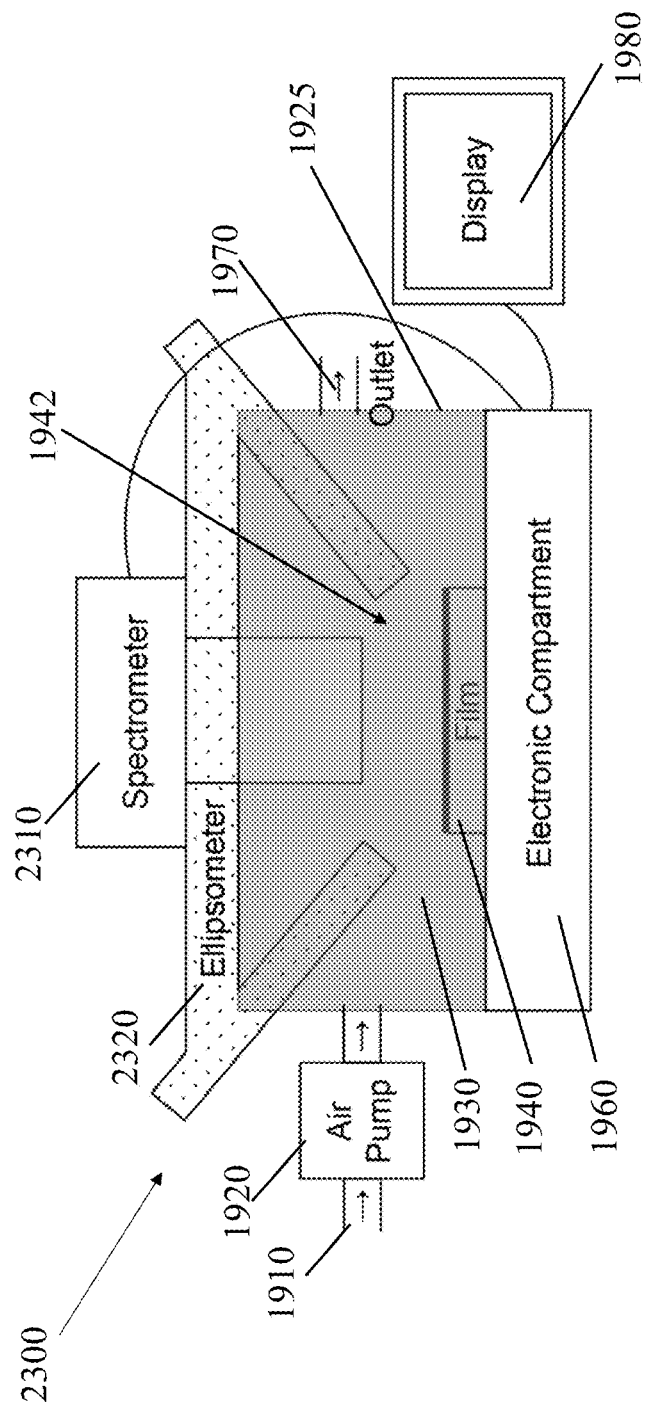

FIG. 19E depicts a fifth embodiment of a sensing device or a sensor system 2300, in accordance with certain examples. Sensing device 2300 comprises inlet 1910, flow control device 1920 (e.g., fan, air pump, etc.), housing 1925 defining a chamber 1930 comprising a sample receiving area 1942, composition(s) or device(s) comprising polymer nanostructures (which may be a film) 1940, electronic compartment 1960, outlet 1970, display 1980, spectrometer 2310, and ellipsometer 2320. Inlet 1910, flow control device 1920, housing 1925 defining a chamber 1930 comprising a sample receiving area 1942, composition(s) or device(s) comprising polymer nanostructures (which may be a film) 1940, electronic compartment 1960, outlet 1970, and display 1980 were previously described herein with reference to FIG. 19A. In reference to FIG. 19A, detector 1950 was described as comprising a reflectometer and a spectrometer, not depicted, to detect changes (e.g., as described herein) in composition(s) or device(s) comprising polymer nanostructures (which may be a film) 1940 in response to contact with a sample (e.g., air or other conveyed gas, liquid, fluid, or the like). The reflectometer may be replaced with ellipsometer 2320) to obtain additional polarization properties that composition(s) or device(s) comprising polymer nanostructures (which may be a film) 1940 may exhibit as a result of contact with a sample (e.g., air or other conveyed gas, liquid, fluid, or the like) in chamber 1930. In some examples, in lieu of, or in addition to the display 1980, the detector 1950 is configured to communicate, directly or indirectly, with a printer or other graphical output device. In various examples, the flow control device 1920 is omitted and, instead, the inlet 1910 is connected to a source of a pressurized gas (e.g., a shop line) and one or more intermediary valves (e.g., motor-operated or solenoid-operated valves) to regulate a flow rate and flow volume of the gas borne by the source of the pressurized gas.

In various examples, a system further comprises one or more electronic compartment(s). In various examples, an electronic compartment is configured to provide detector processing, conducting and/or transmitting the electronic signals to the display(s), or the like, or any combination thereof. In various examples, an electronic compartment is configured to provide detector power. In various examples, an electronic compartment comprises one or more detector power suppl(ies).

In various examples, a system is portable. In various examples, a system further comprises a case, a tray, cart-like components, or the like in which some or all of the other system components are disposed.

In an aspect, the present disclosure provides uses of compositions, devices, and systems of the present disclosure. In various examples, the compositions, devices, or systems are used in analysis of samples. Non-limiting examples of uses are provided herein.

In various examples, a composition, a device, a system, or a method can be used to monitor presence of potentially toxic organic compounds (which may be in the vapor form or the like), such as, for example, VOCs or the like. In various examples, a composition, a device, a system is installed in ventilation systems as an informational addition or as a monitoring addition for automatic environmental control or the like.

In various examples, a composition, device, or system is used in a method of determining a presence or an absence of one or more analyte(s) or a concentration of one or more analyte(s) in a sample. In various examples, a method of determining a presence or an absence of one or more analyte(s) or a concentration of one or more analyte(s) in a sample comprises contacting one or more composition(s) or one or more device(s) with the sample; and determining one or more change(s) or an absence of one or more change(s) in at least a portion of or all of the polymer nanostructures of one or more or all of the composition(s). In various examples, the change(s) indicate the presence or the absence of the analyte(s) or correlate to the concentration of the analyte(s) in a sample. In various examples, at least a portion or all of the polymer nanostructures are in a quenched state prior to contact with the sample.

In various examples, at least a portion of or all the polymer nanostructure(s) independently comprise an acrylate polymer group, a polypeptide group, or the like. In various examples, a polypeptide group is chosen from poly(γ-benzyl L-glutamate) (PBLG) groups, poly(γ-benzyl D-glutamate) groups, poly(β-benzyl-l-aspartate) (PBLA) groups, poly(γ-methyl-L-glutamate) (PMLLG) groups, poly (β-phenethyl-L-aspartate) groups, and any combination thereof.

In various examples, a polypeptide group comprises an intrinsically fluorescent polypeptide group. In various examples, an intrinsically fluorescent polypeptide group is chosen from poly(L-tryptophan) groups, poly(L-tryptophan)-b-PBLG groups, and poly(L-phenylalanine) groups, and the like.

In various examples, a sample is a gas sample, a liquid (or fluid) sample, or the like. In various examples, a liquid (or fluid) sample is a solution. In various examples, an ambient air sample comprises ambient air from any area (such as, for example, areas around fuel stations, parking lots, high traffic areas, or the like) that potentially comprises one or more analyte(s) (such as, for example, VOC(s) or the like) or the like. In various examples, a sample is chosen from ambient air samples, industrial process samples, ventilation system samples, laboratory samples, cleanroom samples, and the like. In various examples, an ambient air sample comprises ambient air from a house, office, laboratory, a cleanroom, or a ventilation system thereof, a residential area, an industrial area, or the like.

In various examples, analyte(s) is/are chosen from volatile organic compounds, and the like, and any combination thereof. In various examples, volatile organic compound(s) is/are chosen from heteroatom organic compounds, aromatic compounds, halogenated organic compounds, and the like, and any combination thereof. Non-limiting examples of heteroatom organic compounds include oxygen-containing compounds (such as, for example, tetrahydrofuran, ethyl acetate, and the like), nitrogen-containing compounds (such as, for example, dimethylformamide and the like), sulfur-containing compounds (such as, for example, dimethyl sulfoxide, and the like), and the like), and any combination thereof. Non-limiting examples of aromatic compounds include benzene, alkylbenzenes (such as, for example, toluene, xylenes, ethyl benzene, and the like), and any combination thereof. Non-limiting examples of halogenated compounds include halogenated hydrocarbons (such as, for example, chloroform, methylene chloride, carbon tetrachloride, chlorobenzene, brominated analogs thereof, and the like, and any combination thereof.

In various examples, change(s) is/are chosen from morphology changes, thickness changes, surface roughness changes (e.g., a surface roughness decrease), film color changes, fluorescence changes, polarization changes, and the like, and any combination thereof. In various examples, a morphology change is observable by scanning electron microscopy or the like. In various examples, a film color change is visually observable or is observable by optical imaging or the like.

In various examples, the concentration of the individual analyte(s) in the sample is 5 ppm (parts per million) to 1,000,000 ppm (or 100%), including all integer ppm values and ranges therebetween. In various examples, the detection limit is 5 ppm for benzene, 10 ppm for toluene, or 20 ppm for xylene.

A method can be a multiplexing method. In various examples, the presence or the absence of two or more analytes or the concentration of two or more analytes in the sample is determined in parallel.

The following Statements describe various examples of compositions, devices, systems, and methods of the present disclosure and are not intended to be in any way limiting:

Statement 1. A composition comprising a substrate a plurality of polymer nanostructures (which may be polymer brushes) (which may be referred to in the alternative as brushes or nanospikes first polymer nanostructures) disposed an at least a portion (or all) of an exterior surface of the substrate, where the nanostructures are arranged in a pre-determined pattern.

Statement 2. A composition according to Statement 1, where the substrate (e.g., all of the substrate, the exterior surface of the substrate, or the like) is non-conducting (such as, for example, silicon dioxide, aluminum oxide, or the like) or conducting (such as for example, a semiconductor (such as, for example, silicon or the like), a metal (e.g., gold, silver, or the like), metal alloy, or the like).

Statement 3. A composition according to Statement 1 or 2, where the polymer nanostructures comprise one or more polypeptide(s).

Statement 4. A composition according to any of the preceding Statements, where at least a portion or all of the polymer nanostructures comprise uniform end groups (e.g., polymer nanostructure end groups opposite the surface of the substrate on which an end of the polymer nanostructure(s) are disposed).

Statement 5. A composition according to any one of the preceding Statements, where the substrate further comprises second polymer nanostructures disposed on at least a portion of, substantially all, or all of the substrate that does not comprise the first polymer nanostructures.

Statement 6. A method of making a substrate of the present disclosure (e.g., a substrate of any of the preceding Statements) comprising: forming a layer of patterned photoresist (e.g., positive tone or negative tone photoresist) disposed on at least a portion of, substantially all, or all of an exterior surface of a substrate; depositing initiator(s) on at least a portion of, substantially all, or all of the exterior surface of the substrate on which the photoresist is not disposed; contacting the substrate (e.g., the areas of the substrate comprising the initiator(s)) with one or more monomer(s), where the polymer nanostructures are formed; and optionally, removing the photoresist.

Statement 7. A method according to Statement 6, where the polymerization is a surface-initiated polymerization (which may be a vapor-phase surface-initiated polymerization).

Statement 8. A method according to Statement 6 or 7, where the polymerization is chosen from ring-opening polymerizations, atom transfer radical polymerizations (SI-ATRPs), Cu(0) mediated controlled radical polymerizations (SI-CuCRP)s (e.g., where at least a portion or all of the initiator(s) comprise an amine end comprising appropriate functional groups), and the like, and any combination thereof.

In various examples, nanopatterned polystyrene brushes were formed by a SI-CuCRP. In various examples, nanopatterned PMMA brushes were formed by a SI-ATRP.

Statement 9. A method according to any one of Statements 6-8, further comprising modifying at least a portion of or all of the end groups of the polymer nanostructures (e.g., polymer nanostructure end groups opposite the surface of the substrate on which an end of the polymer nanostructure(s) are disposed) (which may be amine groups, such as, for example, primary amine groups or the like).

Statement 10. A method according to any one of Statements 6-9, the method further comprising forming second polymer nanostructures disposed on at least a portion of the substrate that does not comprise the first polymer nanostructures.

In various examples, a second polymer nanostructure is a bridging inhibitor.

Statement 11. A method according to any one of Statements 6-10, the method further comprising contacting the polymer nanostructures with one or more solvent(s) (which may be referred to, in the alternative, as solvent quenching).

Statement 12. A device comprising one or more substrate(s) comprising polymer nanostructures of the present disclosure (e.g., substrate(s) of any of Statements 1-5 or made by a method of any of Statements 6-11).

Statement 13. A device according to Statement 12, where the device is an energy harvesting device, a flexible pressure sensor, a biosensor.

Statement 14. A device according to Statement 12, where the device is an electronic device (e.g., a piezoelectric device, an actuator, or the like).

Statement 15. A device according to Statement 12, where the device is an organic electronic device (e.g., a liquid crystal thin film device).

Statement 16. A device according to Statement 12, where the device is a biological (e.g., cell simulation, virus simulation, or the like, or a combination thereof) simulation model.

Statement 17. A device according to Statement 12, where the device is a template (e.g., a template for nanoparticle assembly).

The steps of the methods described in the various embodiments and examples disclosed herein are sufficient to produce a substrate comprising polymer nanostructures of the present disclosure. Thus, in an embodiment, a method consists essentially of a combination of the steps of the methods disclosed herein. In another embodiment, a method consists of such steps.

The following examples are presented to illustrate the present disclosure. They are not intended to be limiting in any matter.

EXAMPLE 1

This example provides a description of compositions and devices of the present disclosure, methods of making same, and uses thereof.

High-Resolution Nanopatterning of Free-standing, Self-supported Helical Polypeptide Rod Brushes via Electron Beam Lithography.

Nanopatterned helical poly(benzyl-L-glutamate) (PBLG) brushes, rod-type brush arrays were fabricated via an integrated process of high-resolution lithography and surface-initiated vapor deposition polymerization (SI-VDP). "Nanospikes" of polymer brushes with spacings of less than 100 nm were produced. The topology and areal behavior of the resulting patterned rod-like brushes were analyzed and compared with patterned coil-type brushes. A geometric study of these self-assembled "nanospikes" was carried out, and their cross-sections were investigated via focused ion beam (FIB) and scanning electron microscopy (SEM). Furthermore, the presence of poly(N-isopropyl acrylamide) (PNIPAM) brushes in unpatterned regions was shown to inhibit undesired "inter-spike" bridging of the PBLG brushes, resulting in more well-defined nanostructures. It was shown that rod-like polypeptide brushes are capable of self-segregation and become arranged vertically without any external support from their surroundings, to form a rod bundle end-point functional topography that could provide possible pathways for studies of model biological surfaces, directed assembly of nanoparticles or binary mixed brushes surfaces with dual properties.

Figures 15A, 15B, 15C:
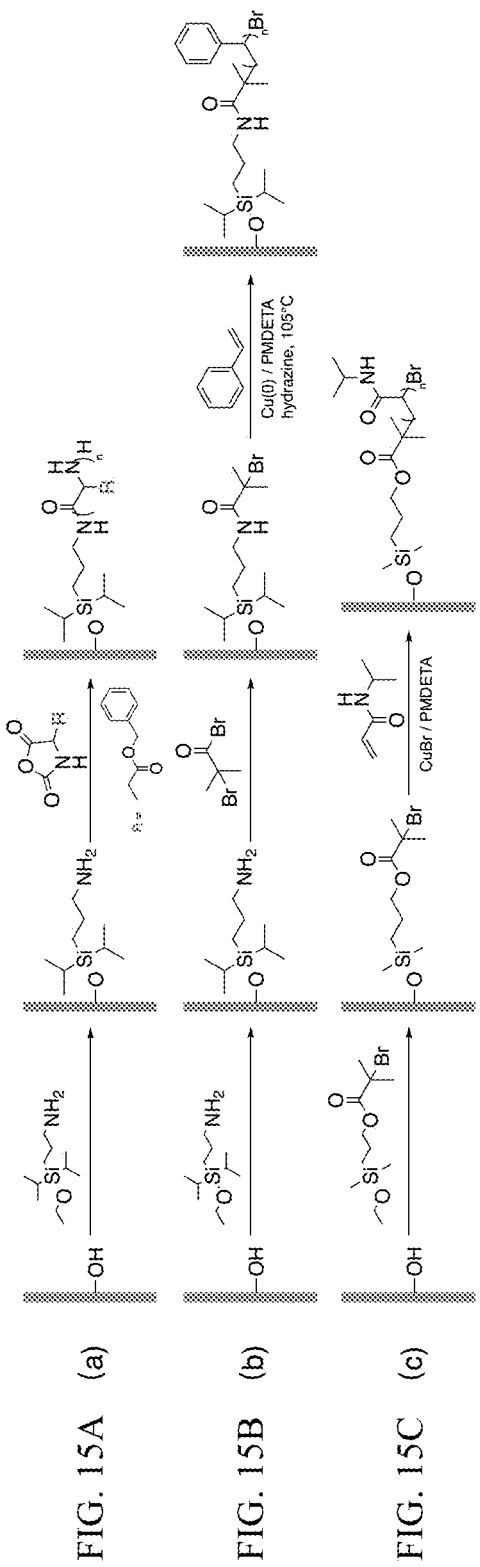
FIG. 15A depicts synthesis of PBLG brushes via surface-initiated ring-opening polymerization ("SI-ROP").
FIG. 15B depicts synthesis of polystyrene ("PS") brushes via surface-initiated Cu(0) mediated controlled radical polymerization ("SI-CuCRP").
FIG. 15C synthesis of poly(N-isopropyl acrylamide) ("PNIPAM") brushes via surface-initiated atom transfer radical polymerization ("SI-ATRP").

FIGS. 15A-C(Scheme 1) show examples of synthesis of (a) PBLG brushes via SI-ROP, (b) PS via SI-CuCRP, (c) PNIPAM via SI-ATRP.

In order to test the control of the processes as well as to examine the self-aggregation behavior of polypeptides under different conditions, polymer brushes with various thicknesses, patterns, and structures were grown for comparative study. Specifically, PBLG brushes were synthesized via surface-initiated ring-opening polymerization (SI-ROP), and poly(N-isopropylacrylamide) (PNIPAM), were separately grown via surface-initiated atom transfer radical polymerization (SI-ATRP) as secondary brushes in a binary brush synthesis (Scheme 1). As noted above, electron beam lithography was used to create patterned amino silane initiators, where a JEOL 9500 EBL system was used to expose a ZEP-520A e-beam resist film (~150 nm) on a blank silicon wafer. The patterned resist film was used to mask initiator deposition after a brief descum process via reactive ion etching. Afterward, vapor deposition of (3-aminopropyl)diisopropylethoxysilane (APDIPES) was carried out. The substrate and APDIPES were placed together in a closed chamber with a pressure of 1 torr and temperature of 70° C. APDIPES was selected due to its bulky size to localize surface deposition to the exposed oxide surface and to minimize transport of APDIPES through the resist film. Vapor-deposition conditions were further optimized to prevent background contamination of the silane in unexposed areas. After the resist lift-off, PBLG brushes were grown via vapor phase SI-ROP under vacuum and elevated temperature, and the solvent quenching process was used. FIGS. 1A-D show an example of formation of nanopatterned brushes via electron beam lithography (EBL)

Topological Analysis and Comparison with Coil Brushes. Topological studies of these polymer brushes were done by the Zeiss Ultra scanning electron microscope (SEM) and Asylum MFP-3D atomic force microscopy (AFM). FIGS. 16A-16D show the brushes fabricated with dot-like EBL patterns: the center-to-center distance was held at 200 nm, and the diameters of the dot-patterned brushes are around 60 nm (FIGS. 16A-16B for PBLG and FIG. 16C for PS) and 100 nm (FIG. 16D for PBLG). As the diameter of the dots increases, the PBLG brushes form separate bundles, reflecting the inhomogeneous segregation of these brushes. Furthermore, the brushes start to interact with each other and form "bridges" between each other at larger spikes, probably due to a decrease in edge-to-edge distance (FIG. 16D). However, "bridges" only formed between edge-adjacent dots, but not if the regions were located on the diagonals.

A simple explanation is that a diagonal is always ~1.41 times more distant than an edge, which makes the "interspike" interaction more difficult. One noteworthy observation is that the polypeptide brushes can stand up on their own without any secondary support, probably due to their high persistence length (~70 nm) and strong intermolecular interactions. A comparison between PBLG brushes and PS brushes further demonstrates this characteristic of the rod brushes. For comparison patterned PS brushes were fabricated through similar procedures described in FIGS. 1A-1D with one additional step for attaching 2-bromo-2-methylpropionyl bromide (BiBB) onto the aminosilane initiator (FIG. 15B). FIG. 16C illustrates the SEM image of patterned PS brushes fabricated via surface-initiated Cu(0) mediated controlled radical polymerization (SI-CuCRP) with the same resist template as the PBLG brushes in FIG. 16A: the edge of the resulting PS brushes became blurry and diffuse, which is in agreement with previous studies, and is consistent with collapse of the brushes at the edges of the patterns due to low polymer persistence length combined with the absence of strong interchain interactions.

Figure 18A:
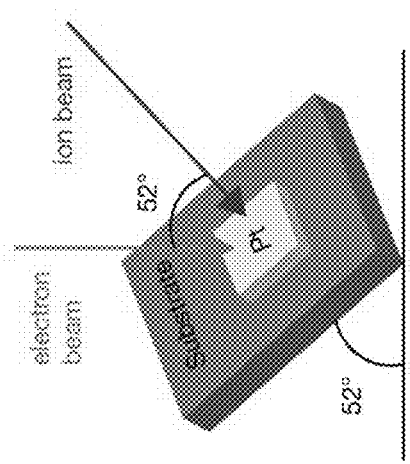
FIGS. 18A-18C depict the use of focused ion-beam ("FIB") for cross sectional analysis. The cross-sectional sample was prepared using a FIB, such as a Thermo Fisher Helios G4 UX Focused Ion Beam. The substrate with PBLG brushes was first cleaned with acetone and dried under a stream of nitrogen gas to eliminate possible surface contaminations.
Figure 18B:
Figure 18C:
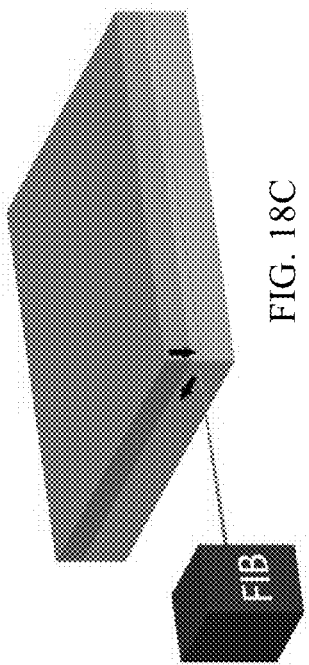

Spike Pattern Geometry and Cross-section Investigation. While SEM images provide insights on the topology of the brushes, it has been limited in assessing more geometric information such as the height and the cross-sectional shapes of the PBLG brushes. FIG. 16B shows the corresponding AFM image of the brushes in FIG. 16A using an Asylum MFP-3D. The average brush height is 60 nm, and cone-shaped tips were observed. In order to obtain more comprehensive understanding of the shape of these "nanospikes", a cross-sectional study was carried out using the Helios G4 UX Focused Ion Beam (FIB) to isolate samples for side view observation. PBLG brushes with line pattern substrate until a very thin slice was obtained. The entire process was monitored via SEM imaging (FIG. 18C). FIGS. 16E and 16F show a cross-section of the PBLG brushes after processing. Instead of straight sides shown in AFM images, the side of the spikes curved inwards, which reflect a non-linear relationship between the collapse tendency of the brushes and height.

Figures 17A, 17B:
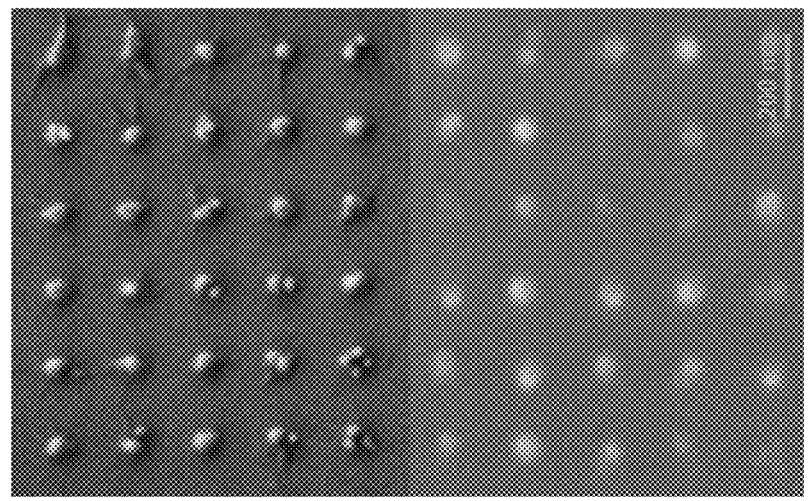
FIG. 17A is an image depicting PBLG homogeneous brushes and FIG. 17B is an image depicting PBLG/poly(N-isopropylacrylamide) ("PNIPAM") mixed brushes with equal magnification.

Binary Nanopatterned Rod-Coil Brushes. While patterned PBLG brushes exhibit high orientation and specific surface functionality with potential for biological applications, the addition of secondary brushes can further modify the surface with unique dual properties. For this purpose, SI-ATRP was integrated after the fabrication of patterned PBLG brushes to grow the secondary brushes at the blank area on the same substrate. PNIPAM was selected for the secondary brush in this case due to its compatibility with SI-ATRP as well as its stimulus responsive properties: as PNIPAM established a change in solubility in water at its lower critical solution temperature (LCST) of 32° C., one can control the swelling of the PNIPAM film in solution to expose or envelop the spiky rod brushes by controlling the surrounding temperature. However, we focused on how the presence of secondary brushes can isolate and potentially support the PBLG "nanospikes". The secondary brush synthesis was carried out via a two-step procedure. ATRP initiators were immobilized into non-patterned areas by immersing the sample into a solution of BiBB-functionalized silanes overnight at room temperature; SI-ATRP was then carried out for PNIPAM brush growth in the desired area (FIG. 15C). The resulting binary brush sample was then analyzed by SEM and AFM and compared with the PBLG homobrush sample in FIGS. 17A and 17B. The height of PNIPAM brushes was measured as 25 nm using ellipsometry. Instead of a spiky surface with clean, sharp nano-cones, the surface after PNIPAM brushes growth is smoother the secondary brushes filled the blank area and causing the edges to be less defined. Also, the addition of PNIPAM brushes improved phase separation, which is reflected by the decrease in the number of "bridges" between the nano-cones and bundles within each area. Additionally, the same sample was scratched to remove brush from the region of the scratch and examined using SEM imaging to provide a more visual comparison of the relative height of the PNIPAM, and PBLG brushes on the silicon surface (FIG. 21) to confirm the ellipsometer readings of the presence of secondary PNIPAM brushes in the open area, which might not be directly noted in FIGS. 17A and 17B.

Preparation of patterned polypeptide brushes via SI-ROP following EBL patterned initiator formation is described. This work combined distinct techniques from the areas of oxide surface functionalization using organosilane monolayers with e-beam nanolithography to achieve nanoscale localized functionalization, combining surface-initiated polymer brush growth to form polymer thin films. Patterned PBLG brushes with diameters of 60 nm-100 nm were produced, and vertically oriented "nanospikes" were formed after a solvent quenching process. In contrast, PS brushes showed a collapsed morphology due to the coil polymer's lower persistence length (~1 nm). In addition, PNIPAM brushes were grown in the "blank" areas to make patterned binary rod-coil brushes for stimuli-responsive surfaces.

The mild conditions of vapor phase deposition make this method particularly useful in combination with the EBL into the patterning procedure. The bottom-up patterning method reduces process defects and allows polymer films to remain intact, compared to top-down approaches where films are etched after being made. Furthermore, the grafting-from synthesis approach, i.e., surface-initiated polymerization, results in high grafting density, controlled and uniform film thickness, thus achieving enhanced self-assembly of the mixed rod-coil polymer brushes. Combination with a solvent quenching process significantly reduced the annealing time compared to the thermal or solvent annealing techniques compared to block copolymer self-assembly.

Experimental Methods.

Materials. Allyl-2-bromo-2-methylpropionate, 2-bromo-2-methylpropionyl bromide (BiBB), anhydrous triethylamine (TEA), hydrazine, copper(I) bromide, pyridine, hydrogen hexachloroplatinate hexahydrate catalyst, basic alumina, anhydrous toluene, N,N-dimethylacetamide (DMAc), styrene, N-isopropylacrylamide (NIPAM), 1,1,4,7,7-penta-methyldiethylenetriamine (PMDETA), triphosgene and γ-benzyl L-glutamate were purchased from Sigma Aldrich. Dimethylethoxysilane and 3-amino-propyldiisopropylethoxysilane (APDIPES) were purchased from Gelest. NIPAM monomer was recrystallized from hexane. Styrene was passed through basic alumina to remove the inhibitor before use. Copper tape (882L COPPER) with 88.9 μm copperfilm was purchased from Lamart Co. Deionized water with a resistivity of 18.2 MΩ·cm at 25° C. was obtained from Millipore's Milli-Q Synthesis A10 system. All other solvents were purchased from Fisher Scientific. Si (100) polished wafers were from WRS Materials. Cantilevers were purchased from Applied NanoStructures, Inc. (ACCESS-NC). ZEP-520A positive resist (57 k) and ZEDN50 developer were provided by Zeon Chemicals LP.

Synthesis.

Patterned PBLG Brushes Synthesis. Preparation of the E-Beam Mask. Silicon wafers were thoroughly cleaned using a Harrick Plasma Cleaner for 10 minutes, then rinsed with ethanol and acetone, and heated at 110° C. to remove moisture. ZEP-520A was spin-coated onto the wafer and baked at 170° C. for 2 min. The resist film thickness was around 150 nm (FilMetrics F50-EXR). The resist was then exposed using the JEOL 9500 EBL system with a beam current of 2 nA and a dose of 350 μC/cm$^2$. The exposed film was immersed into ZEDN50 developer for 3 min, transferred into methyl isobutyl ketone for 30 seconds, and rinsed with Propan-2-ol for 30 s. The sample was dried with a stream of nitrogen gas. Residual resist in the exposed area was then cleaned by the Oxford PlasmaLab 80Plus RIE System at 200 mTorr and 40 W for 30 s. Nanohole arrays with a center-to-center distance of 200 nm was fabrication via this process.

Immobilization of Silane Initiators. APDIPES (100 μL) was pipetted into a small glass vial and placed into a closed chamber. The wafer with patterned resist was then placed into the same chamber beside the glass vial. The chamber was then brought to vacuum (1 torr) and placed in an oil bath at 70° C. for a controlled time period. The ZEP-520A resist was then removed by sonicating in N, N-dimethylacetamide and isopropanol for 5 min and dried under nitrogen gas.

PBLG Brushes Synthesis via SI-ROP: PBLG Brushes Synthesis via SI-ROP. The γ-benzyl L-glutamate N-carboxyanhydride (NCA) monomer was synthesized using previous literature procedure. The NCA monomer (10 mg) was then added to a 10 mL beaker. The initiator-immobilized wafer was placed on top of the beaker with the pattern at the center. The beaker and the substrate were then put into a closed chamber and brought under vacuum (0.5 torr) and elevated temperature (105° C.) for two hours. After the reaction, the substrate was soaked in chloroform overnight, rinsed for 30 s and dried with nitrogen gas. For the quenching process, the polymer brush sample was immersed into chloroform for a controlled time period. Then it was quickly transferred to acetone for a controlled time period.[2] Afterwards the sample was dried under a stream of nitrogen gas.

Patterned PS Brushes Synthesis. The preparation of E-beam mask was the same as that for patterned PBLG brushes.

Preparation of Immobilized ATRP Initiators. There was one additional step of attaching allyl 2-bromo-2-methylpropionate to the immobilized APDIPES to obtain monofunctional ATRP initiator with desired patterns on wafer: the substrate with immobilized APDIPES was placed in a 20 ml vial with 5 ml anhydrous dichloromethene (DCM). TEA (100 µL) and BiBB (100 µL) were then added to the vial and the reaction was carried out for 90 min. The substrate was then cleaned with DCM and methanol and dried with a nitrogen gas stream.

PS Brushes Synthesis. PS brushes were synthesized via surface-initiated Cu(0) mediated controlled radical polymerization (SI-CuCRP). Glass slide was cut into small pieces with a similar size to initiator-immobilized substrates. Cu tape was stuck onto glass pieces. A piece of Cu-taped glass was clamped together with the substrate with patterned immobilized ATRP initiator substrate by a copper clamp. A Teflon space with thickness of 1 mm was used to separate the pieces. The setup was put into a solution of 2 mL styrene, 1 mL dimethylsulfoside, 36 µL PMDETA, and 1.5 µL hydrazine, and polymerization was conducted at 105° C. for a given time. Afterward, the glass slides were removed from the solution and rinsed with dichloromethene, ethanol, and dried with nitrogen gas.

PNIPAM Brushes Synthesis as Secondary Brushes. Substrate with patterned PBLG brushes was prepared following the procedure described above.

Deposition of ATRP initiator. Samples with patterned PBLG brushes was immersed into a solution of (3-(2-bromoisobutyryl)propyl) dimethylethoxysilane, in anhydrous toluene (50 mM) overnight at room temperature. After that, the samples were washed with toluene, methanol and dried with nitrogen gas.

PNIPAM brush polymerization. Samples with patterned PBLG brushes and immobilized ATRP initiator were placed into a 25 mL Schlenk flask which was then evacuated and backfilled with Argon for five times. CuBr (14.5 mg, 0.1 mmol) was put into another 50 mL Schlenk flask with a magnetic stir bar, and it was evacuated and backfilled with Argon for five time. NIPAM (0.56 g, 5 mmol) and PMDETA (54 mg, 65 µL, 0.3 mmol) were dissolved in 10 mL of a 7:3 methanol:water mixture, and purged with Argon for 20 minutes before being cannulated into the flask containing CuBr. The mixture was stirred for 20 minutes before being cannulated into the flask containing the sample with patterned PBLG brushes. The polymerization was run at room temperature. After that, the samples were sonicated in methanol, ethanol and water and dried with nitrogen. For the quenching process, the polymer brush sample was immersed into chloroform for 30 minutes. Then it was quickly transferred to acetone for 20 min (min(s)=minute(s)). Afterwards the sample was dried under a stream of nitrogen gas.

Characterization.

Atomic Force Microscopy (AFM). Asylum MFP-3D atomic force microscopy was used to characterize the topography of patterned polymer brushes. The dry topography was characterized with AC tapping mode using silicon cantilevers (model: ACCESS-NC).

Optical Ellipsometry. Thickness of PNIPAM brushes outside of patterned PBLG brushes was measured with an Imaging Ellipsometer—Nanofilm EP3 at 532 nm laser at 50-60° angle of incidence. A Cauchy model was used to fit the data, in which the Cauchy layer was representative of the polymer brush.

Scanning Electron Microscopy (SEM). The SEM images (except for cross-sections) were taken by Zeiss Ultra SEM with an accelerating voltage ranging from 0.5 to 1 kV. No coating was done on any of the examining surfaces.

Focused Ion-Beam (FIB) for Cross-sectional Analysis. The cross-sectional sample was prepared using the Thermo Fisher Helios G4 UX Focused Ion Beam. Substrate with PBLG brushes was first cleaned with acetone and dried under a stream of nitrogen gas to eliminate possible surface contaminations. Subsequently, the cleaned sample was loaded into the machine, and a selected area with patterned PBLG brushes was coated with a thin layer of Pt (around 1 micrometer) via the built-in electron-beam deposition function in the instrument (see, e.g., FIG. 18A). The sample was then tilted at 52 degrees and was etched by FIB with a beam current of 30 keV. Afterwards, the surface was polished by FIB with beam current of 5 keV. The entire process was monitored using electron beam imaging from a top-down view angle with a voltage of 5 kV. The PBLG brushes' cross section was then closely observed with an increased voltage of 10 kV for better image quality, and the figures were exported for further analyzation. FIG. 18B shows a scratched binary patterned sample for comparison analysis. FIG. 18C shows cross-sectional analysis via FIB.

EXAMPLE 2

This example provides a description of compositions and devices of the present disclosure, methods of making same, and uses thereof.

Figure 9A:
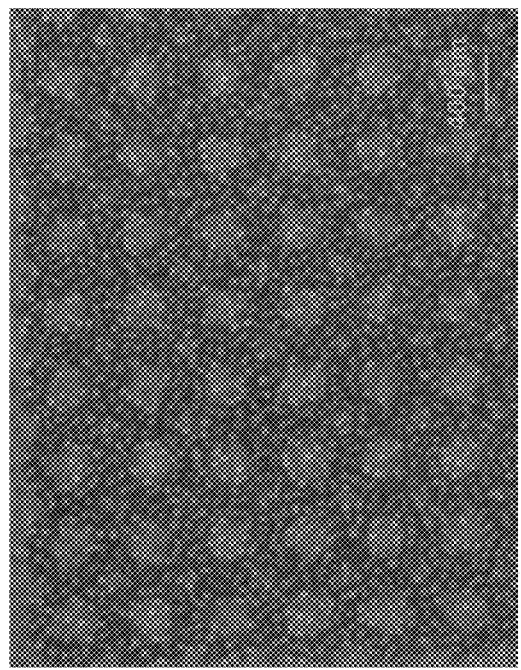
FIG. 9A and FIG. 9B depict examples of patterned brushes. Using nanolithography as the patterning medium, the pattern is customizable with a resolution of sub-50 nm with features as small as 1-2 nm.
Figure 9B:
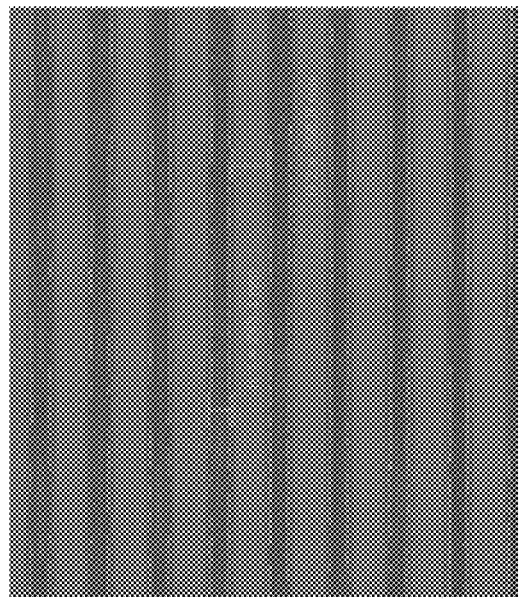

FIGS. 9A-9B depict examples of substrates comprising polymer nanostructures of the present disclosure. As nanolithography was used as the patterning process, the resulting polymer nanostructure pattern is customizable and was produced in the resolution of sub-50 nm. The smallest feature that can be achieved for the resist mask was 1-2 nm using electron-beam lithography. Figures below show examples of patterned brushes (scaling are the same for both images).

Figure 10B:
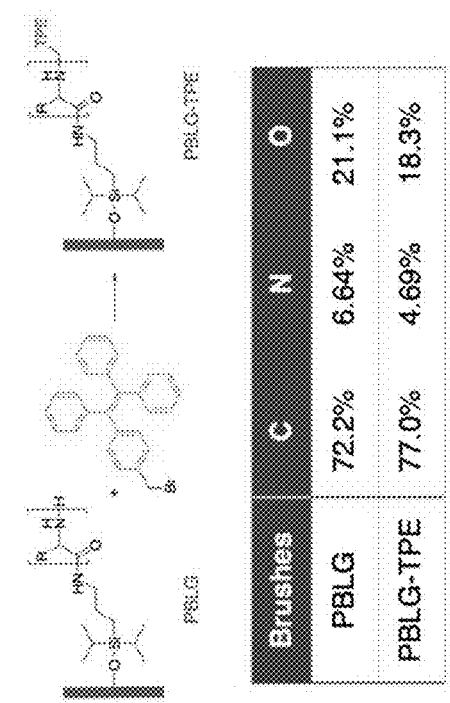
FIG. 10B depicts successful end-point modification with tetraphenylethene, a material that shows florescent properties, and confirmed by elemental analysis via X-ray photoelectron spectroscopy ("XPS").
Figure 10A:
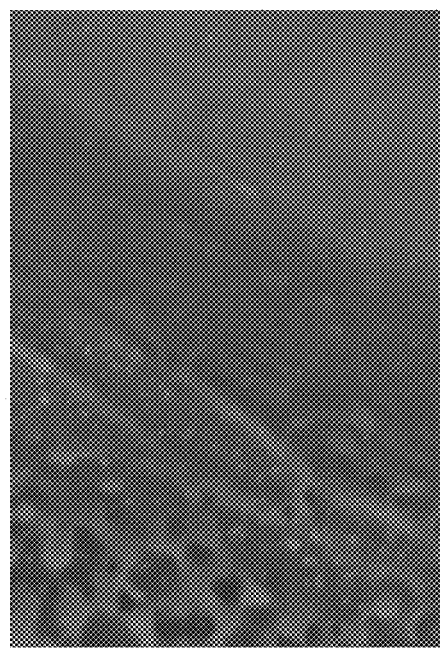
FIG. 10A is a SEM image depicting gold nanoparticle attachments on the brushes but not the silicon wafer after brief rinsing and sonication in water for 30 s and acetone for 30 s.

Nanoparticles were attached to polymer brushes as shown in the SEM image depicted in FIG. 10A. Gold nanoparticles only attached to the brush region but not the silicon wafer after brief rinsing and sonication in water for 30 s (s=second(s)) and acetone for 30 s.

Successful end-point modification with tetraphenylethene, a material that shows florescent properties, was confirmed by elemental analysis via XPS Spectroscopy (as shown in FIG. 10B.

Stimuli-responsive surfaces with dual properties were formed. The surface with nanospikes can be further processed to form a second brush in the blank area. By controlling the swelling of the surrounding brushes, we can expose or bury the active end-group of the spikes, and hence achieving surface with switchable morphology and functionality. Binary brushes (PBLG-PNIPAM) were formed.

Figures 11A, 11B:
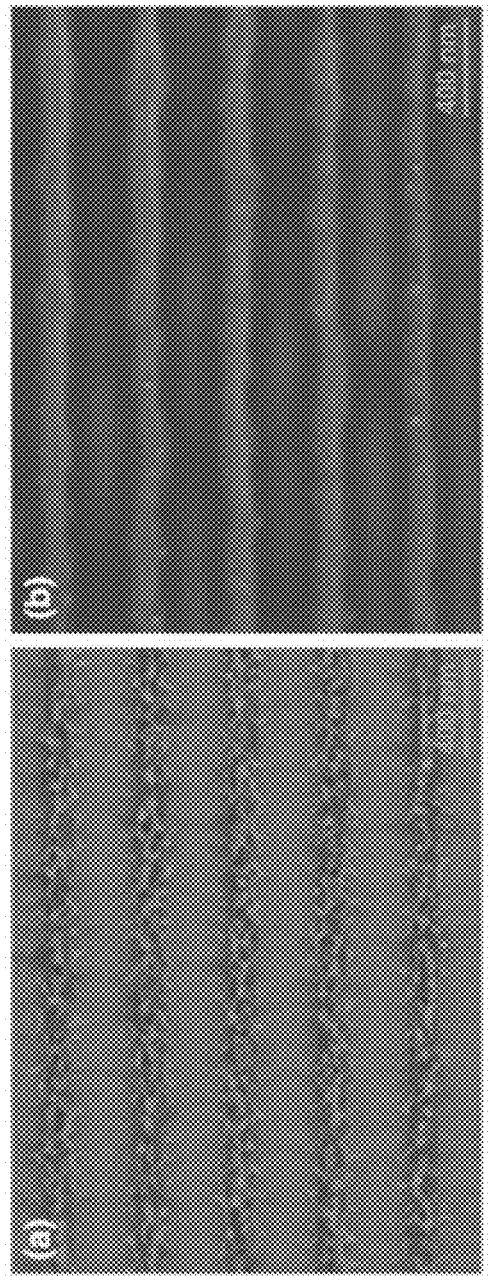
FIGS. 11A and 11B are SEM images depicting solvent-induced active end-group distribution. After solvent quenching, the PBLG brushes have a uniform upright alignment with the amine-group pointing up.
Figure 12:
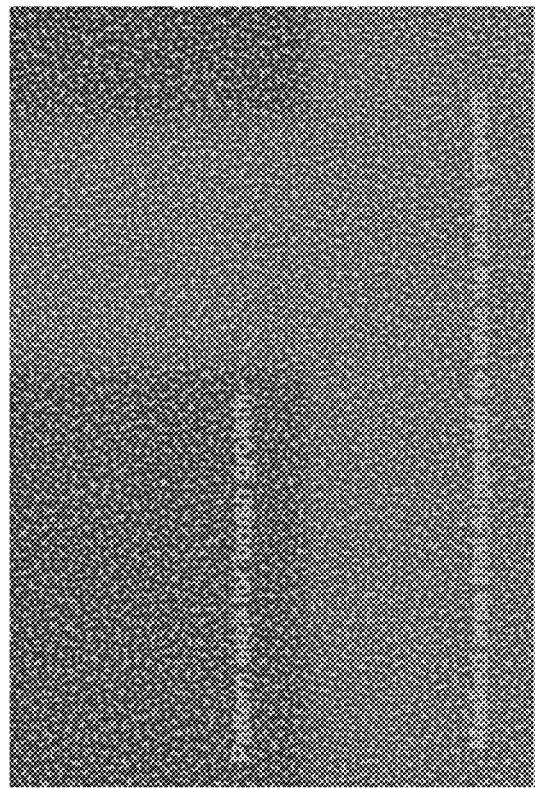
FIG. 12 is a SEM image depicting area-selective deposition of initiators. Patterning is possible by masking areas of the silicon oxide surface to prohibit brush growth. In an example, (3-aminopropyl)di-isopropylethoxysilane ("APDIPES") is used as an initiator because more common aminosilanes, such as, for example, 3-aminopropyl-triethoxysilane ("APTES") and 3-aminopropyl-trimethoxysilane ("APTMS"), can diffuse through the surface because they are smaller in size, hence causing excess brush growth in masked area as shown in the figure. The steric hindrance caused by the isopropyl groups on APDIPES effectively limits such diffusion, hence making the patterning possible.
Figure 13:
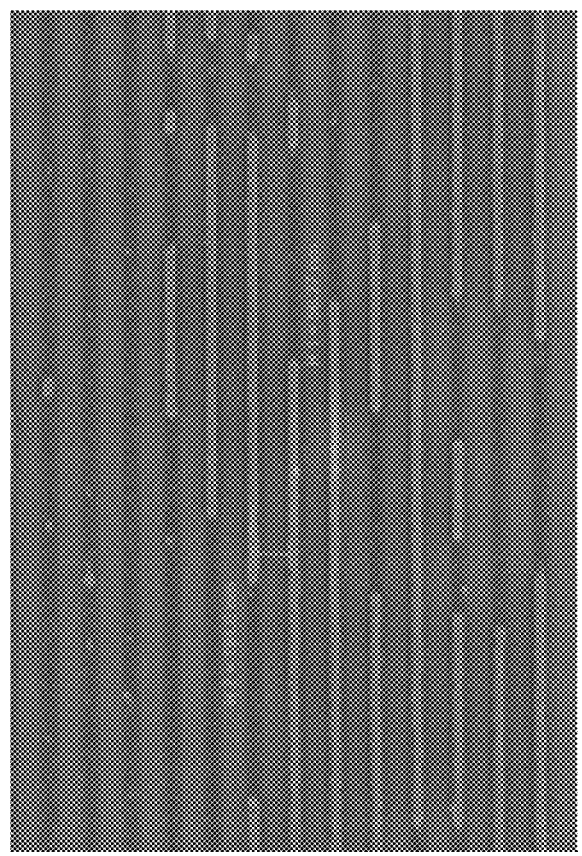
FIG. 13 is a SEM image depicting vaporization of γ-benzyl L-glutamate N-carboxyanhydride ("NCA") monomer and uniformity of brushes. The NCA monomer is a solid under room temperature with a melting point of around 93° C., which makes it hard to form a dense vapor that is necessary for vapor phase surface-initiated polymerization. As such, high temperature and strong vacuum are necessary for the process. The purity of the monomer is also critical to the process as impurities can cause disruptions in vapor formation as well as surface-initiated polymerization—re-crystallization was done twice, and the synthesized monomer was kept at −20° C. in nitrogen-purged sealed vials to ensure purity and stability.
Figure 14:
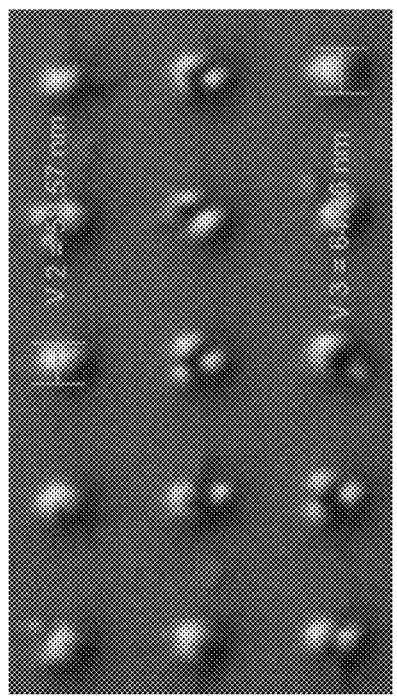
FIG. 14 is a SEM image depicting phase separation and solvent-induced brush alignment. Polypeptides, especially PBLG, can form self-aggregates after "solvent quenching" treatment, which enables the formation of clean spiky surfaces with location-specific tunable anisotropic properties and chemical properties in sub-50 nm scale.

Solvent-induced active end-group distribution: It was shown that PBLG brushes after solvent quenching will have a uniform upright alignment with all the amine-group pointing up. Such phenomena were also observed where the brush morphology changed drastically after being processed by different solvent combinations. An example of this phenomena is depicted in FIGS. 11A-11B (where FIG. 11A shows quenched brushes and FIG. 11B depicts collapsed brushes). The tilt angle and orientation of the rod brushes can be adjusted using this approach.

Nanopatterned polypeptide brushes with features smaller than 50 nm and well-defined phase aggregation were formed.

EXAMPLE 3

This example provides a description of compositions and devices of the present disclosure, methods of making same, and uses thereof.

PBLG Brushes Film as Hazardous Volatile Organic Chemical Sensors

Volatile Organic Chemicals (VOCs) and Detection Methods. VOCs are organic compounds with low boiling point and high vapor pressure and hence can evaporate readily at room temperature. They are some of the major air pollutants that is causing health risks including respiratory, allergic, immune, or carcinogenic effects in human when being exposed at ppm level. Some of the VOCs can also participate in the formation of tropospheric ozone and smog and hence generating further environmental concerns. As such, the emission of VOSs has been heavily regulated and there is an increasing need of fast, sensitive, and high-resolution detection of VOCs present in air.

Currently, the main quantification and identification methods for VOC analysis are gas chromatography and mass spectrometry (GC-MS), which is capable of separate most of the VOCs at ppm level and hence provide high-resolution measurements.

Due to delicacy and bulkiness of GC-MS equipment, on-site VOC monitoring is usually impractical, and hence these resulting measurements are usually time-insensitive. As such, alternative sensing devices have been researched for rapid, responsive VOC detections. Examples could be resistive-based devices, Quart-Crystal Microbalance (QCM) sensors, and optical sensors. However, these methods usually associated with disadvantages such as low-sensitivity, long response time, low differentiability or delicate film fabrication processes which are not feasible for industrial manufacturing. Hereby, we proposed a VOC sensing device using polypeptide nanostructured surface that is responsive, sensitive, discriminant and practical for possible large-scale manufacturing.

Polypeptide Nanostructured Surfaces for VOC Detections. An integrated process of surface-initiated reactions, vapor-phase deposition, and electron beam lithography was used to produce well-defined polypeptide nanostructures that are bonded covalently to the surface, enabling the precise, reversible manipulation of molecular assembly of these polymer structures using solvent treatments. Methods of chain-end modification of these brushes with florescent dyes as well as the associated film responses towards various VOCs were explored for potential sensing device applications.

The demonstration was carried out with various organic solvents that has been reported to be highly toxic and takes up a high fraction of the overall VOC emission, namely, aromatic solvents such as benzene, toluene, xylenes and halogenated solvents such as chloroform. The polypeptide selected is PBLG due to its structural proximity to aromatic compounds and good interactions with halogenated solvents. Since the brushes collapsed upon contact with aforementioned organic solvents, the film was treated with solvent treatment to ensure the quenched state before contacting the respective solvent for actual measurements.

Morphology Changes. The color of the polymer film changes immediately when in contact with all of the selected solvents as shown in FIGS. 5A-5D. Visible color changes were also observed for ethylbenzene, dichloromethene, and tetrahydrofuran. This provides a direct indication of a positive response before any quantitative measurement was carried out. The surface morphology of the quenched and collapsed state was then examined using scanning electron microscope (SEM)—the surface morphologies were different when the film was treated with different solvent.

Figure 6:
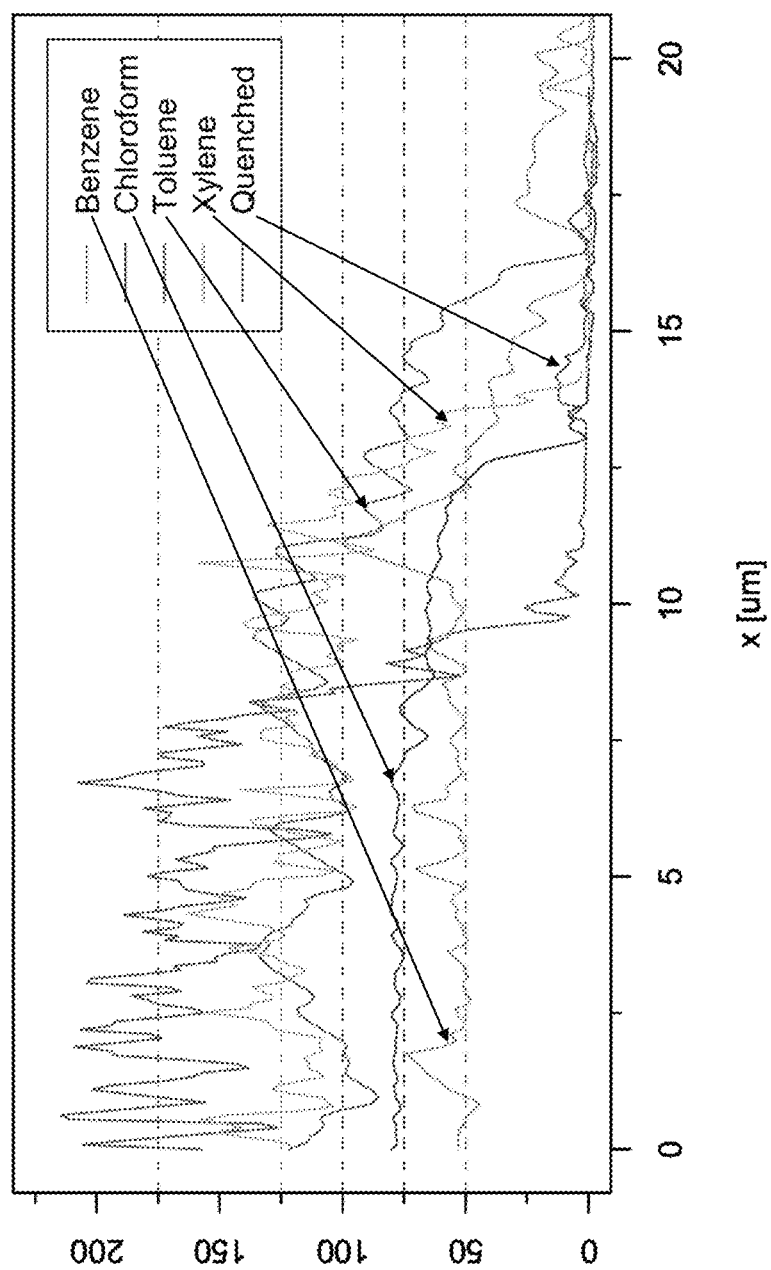
FIG. 6 depicts a change in polymer film thickness as measured by an atomic force microscope ("AFM") after exposure to selected solvents.
Figure 7A:
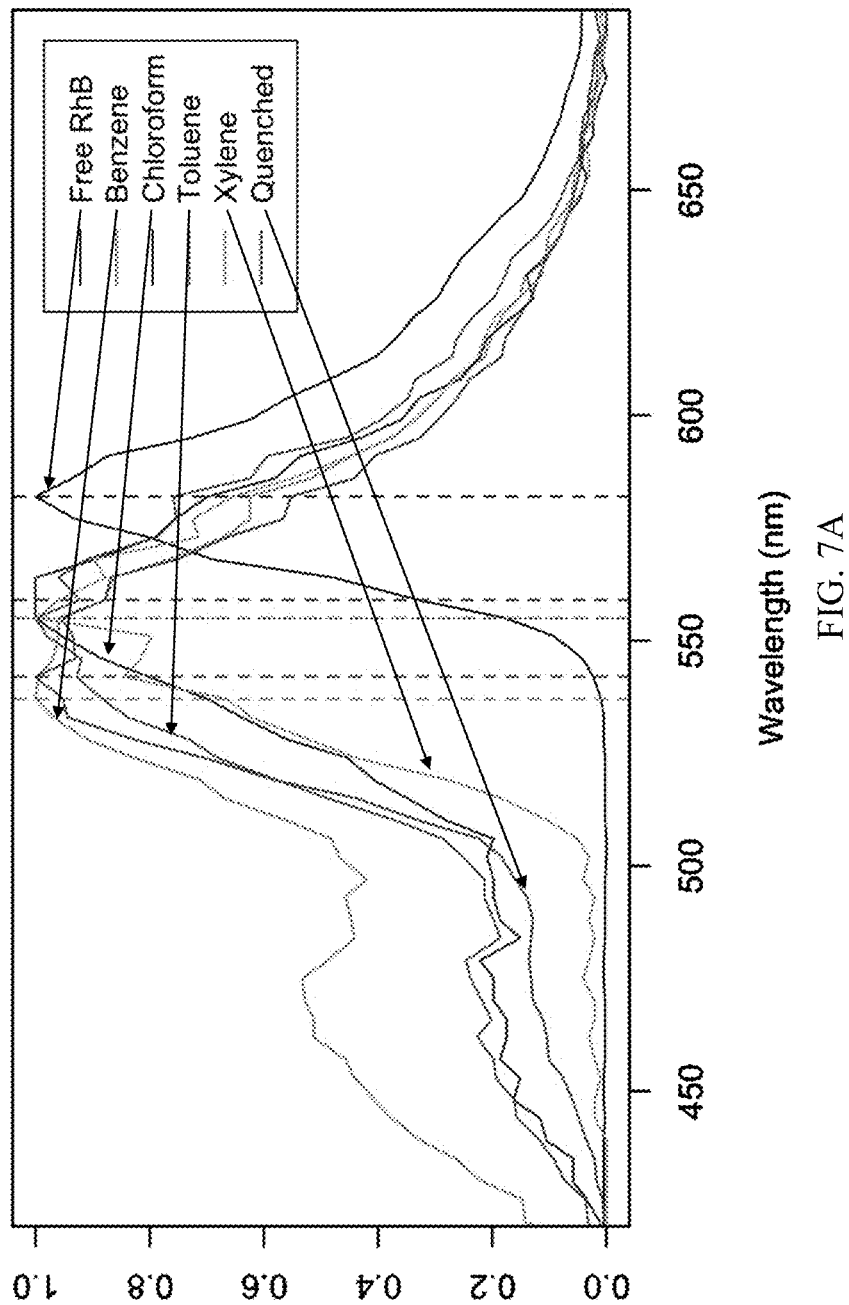
FIG. 7A depicts a florescence response by the polymer film after exposure to selected solvents with the chain-end of the poly-γ-benzyl-L-glutamate ("PBLG") brushes modified by a florescent dye (Rhodamine B), with the response analyzed by emission spectra.

Furthermore, the thickness of the film also changed in response to different solvents as measured by atomic force microscope (AFM) (see FIG. 6). These changes can be directly monitored using, for example, an optical reflectometer/ellipsometer, which has a resolution of a few nanometers.

Emission Spectra. In order to enable multi-parameter monitoring to ensure a highly discriminate and accurate result, the chain-end of the PBLG brushes was modified with florescent dye (Rhodamine B) and the respective florescence response was analysis via emission spectra (see FIG. 7A).

The spectra showed different fluorescence responses for different solvents. An emission spectra of free rhodamine B (RhB) solution were included in the figure for referencing purposes. Compared to the free RhB solution, the dye aggregated when being attached to the brush and hence all wavelength corresponding to the maximum intensity shifted to the left (From 582 nm to 530-560 nm). Furthermore, the emission spectra for RhB-PBLG films showed left shoulder with different intensities, which was associated with the effect of scattering, absorption and reabsorption possibly due to different degree of pi-pi stacking of the benzyl side group on the chain. The emission spectra can be collected real-time using spectrometer.

TABLE 3

Summary of the results mentioned above.

| | Benzene | Toluene | Xylene | Chloroform | Quenched | Free RhB |
|---|---|---|---|---|---|---|
| $\lambda_{max}$ | 537 nm | 555 nm | 555 nm | 559 nm | 542 nm | 582 nm |
| Shoulder Intensity$_{max}$ | 0.53 | 0.24 | 0.04 | 0.22 | 0.13 | N.A. |
| Thickness | ~50 nm | ~100 nm | ~125 nm | ~80 nm | ~175 nm | N.A. |

Schematic Illustration of Sensing Device. FIGS. 19A-19E show alternative designs of the sensing devices. The main components include a pump to introduce surrounding air into the chamber, the detector with reflectometer and spectrometer, a corresponding electronic compartment for the detector and the connection to a display that show the data.

Figure 8:
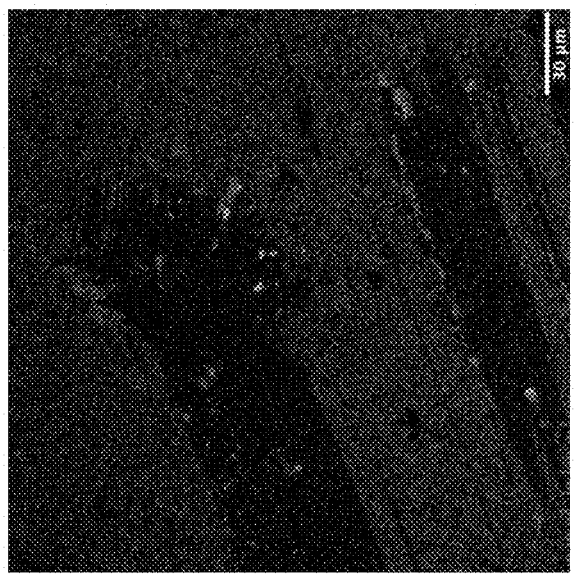
FIG. 8 depicts a florescence response by Poly(L-tryptophan)-b-PBLG brushes.

Alternatives. Polymer. In addition to PBLG, other polymer brushes such as poly(β-benzyl-l-aspartate) (PBLA), poly(γ-methyl-L-glutamate) (PMLG) and block co-polymers such as PMLG-b-PBLG, PBLA-b-PBLG can also undergo molecular re-arrangement when treated with solvent. Also, one can use intrinsically florescent brushes to simplify the film fabrication process. One example could be Poly(L-tryptophan)-b-PBLG brushes which was found to be having florescence response as shown in FIG. 8.

Florescent Dye. While RhB was used in this demonstration, one can also use other dyes such as, for example, tetraphenylethene and fluorescein isothiocyanate to modify the chain-ends for different aggregation mechanism. It is possible to place multiple film samples under the detector to collect different spectra to get highly discriminative results.

VOCs. The main mechanism for the film response is the interaction between the polymer chain and the present organic vapor. As such, any solvent that was shown to have good solubility to the polymer should induce a positive response. Some examples of other VOCs could be styrene, ethylbenzene, dimethylformamide, dichloroacetic acid, dichloromethene, tetrahydrofuran, etc.

The amino-silane initiator 3-aminopropyldimethylethoxysilane (APDMES) in is less compatible for the patterning technique because of the small molecule will be able to diffuse through the resist mask due to less steric hindrance. (3-aminopropyl)di-isopropylethoxysilane (APDIPES) was used to achieve the area-selective deposition—the two propyl groups were proven to largely limit the diffusion. Also, APDIPES was more stable than APDMES so the stability and shelf-life of the treated sample was also improved.

In in-solution deposition of amino-silane initiator may be incompatible for the patterning approach since organic solvent would damage the resist mask and introduce defects and contamination. Vapor deposition of APDIPES was used and the conditions were tuned to ensure no damage on the patterns and precise control in the deposition environment.

Simple heated the whole system to 105° C. can initiate both the vaporization of BLG-NCA monomer as well as the polymerization on the silicon substrate. However, the thickness of brushes can be heavily affected by the temperature of the substrate ($T_{sub}$) and the temperature of monomer ($T_{mon}$). As such an updated setup was developed.

Previous setups for surface-initiated polymerization of PBLG were shown to be limited and over-simplistic—heating the monomer over the melting point will initiate polymerization in the melted bulk, hence forming physiosorbed unattached polymer on the surface. This will result in disruption of the surface-initiated living chain growth due to physical blockage or early chain-growth termination. However, heating the monomer reservoir to temperature above the melting point is required to promote strong vaporization of monomers for vapor deposition process.

Figure 22:
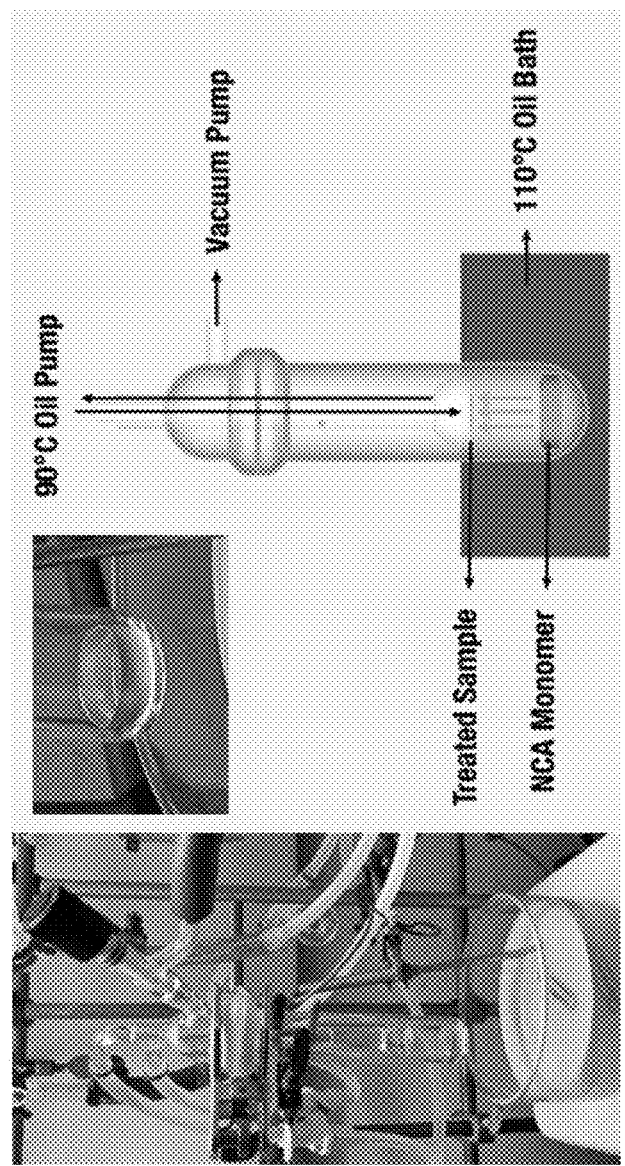
FIG. 22 depicts an example setup of surface-initiated polymerization of PBLG using a sublimation apparatus to incorporate a temperature difference between a silica substrate and a monomer reservoir. In the example, the substrate is attached to the end of a condenser comprising silicon oil pumping in and out at 90° C. to ensure a lower $T_{sub}$. The NCA monomer is heated to 110° C. by a surrounding oil bath ($T_{mon}$). The monomer was allowed to vaporize rapidly under high temperature while the substrate was cooled to a relatively low temperature to ensure optimized brush growth. The temperatures of 90° C./110° C. can be changed depending on specific conditions and reactions.

As such, a sublimation setup (FIG. 22) was developed to incorporate a temperature difference between silica substrate and monomer reservoir as shown in the figure below: the initiator-functionalized substrate was attached to the end of the condenser, which has silicon oil pumping in and out at 90° C. to ensure lower $T_{sub}$, the NCA monomer was heated to 110° C. by the surrounding oil bath ($T_{mon}$). In this way, the monomer was allowed to vaporize rapidly under high temperature while the substrate was "cooled" to a relatively low temperature to ensure optimized brush growth. Note: the temperature of 90° C./110° C. can be changed depending on the specific conditions and reactions. A sublimation apparatus originally purchased from commercially available sources. The bottom part was later customized to flat bottom to ensure homogeneous heating at the reservoir (as shown in the zoomed photo).

Monomer reservoir preparation. It was found that the NCA monomer in the bottom reservoir could polymerize on its own under high temperature and was no longer capable of vaporizing and forming brushes on the substrate—as such, amount of monomer per area could largely affect the performance of the vapor deposition. In the prior work, the monomer was "added and spread" at the bottom of the beaker, which could result in uneven distribution. Recently, we updated the monomer reservoir process—a controlled amount of NCA monomer was added to the aluminum container and dissolved in a few drops of ethyl acetate to form a concentrated solution. The solution was then dried by evaporation without any disturbance. A more uniform film was then formed in the reservoir.

Figure 23:
FIG. 23 depicts vapor deposition on conductive surfaces. A conductive substrate is needed for the study of and applications of electronic and piezoelectric properties of PBLG brushes. A vapor phase deposition process to deposit cysteamine as the initiator on gold substrate was developed with successful brushes growth achieved using the initiated deposition method followed by new polymerization process described in reference to FIG. 22 with temperatures of 75° C./85° C.
Figure 24:
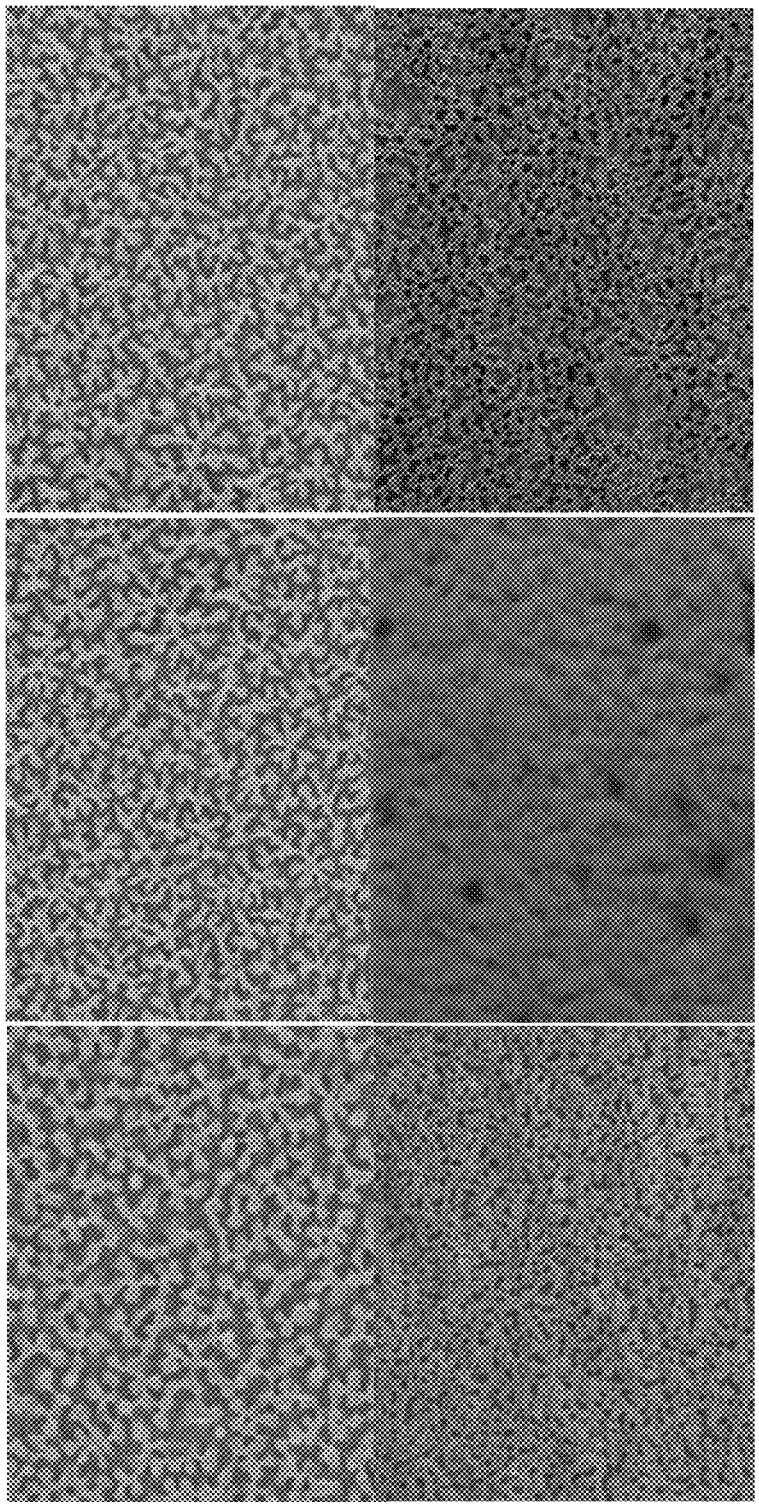
FIG. 24 depicts PBLG brushes in response to BTX vapor exposure. The top images (for benzene, toluene, and xylene respectively) are images prior to BTX vapor exposure. The bottom images (for benzene, toluene, and xylene respectively) indicate PBLG brushes response to BTX vapor exposure. In an example, PBLG brushes were exposed to benzene at 5 ppm, toluene at 10 ppm, and xylene at 20 ppm.

Vapor Deposition on Conductive Surfaces. A conductive substrate is required for applications of electronic and piezoelectric properties of these brushes. A simple vapor phase deposition process was developed to deposit cysteamine as the initiator on gold substrate (FIGS. 23—vapor deposition of initiator (left), gold surface (center), resulting PBLG brushes (right)). Successful brushes growth was achieved using the initiated deposition method followed by polymerization process described above with temperature of 75° C./85° C.

Pattern alternatives. Nanolithography was used as the patterning medium, the pattern is highly customizable and can be produced in the resolution of sub-50 nm. The smallest feature that can be achieved for the resist mask is 1-2 nm using electron-beam lithography. FIGS. 9A and B show examples of patterned brushes using other templates.

Polymerization alternatives. In addition to ring-opening polymerization, other surface-initiated polymerization such as atom transfer radical polymerization (SI-ATRP), Cu(0) mediated controlled radical polymerization (SI-CuCRP) can also be used after modifying the amine end on the initiator with appropriate functional groups. Nanopatterned polystyrene brushes were synthesized using SI-CuCRP. Nanopatterned PMMA brushes were synthesized using SI-ATRP.

Substrate alternative. Successful brush growth was shown on gold, which shows the possibility of applying our techniques to alternative substrates—for example, aluminum oxide has also been shown to be compatible with growing polypeptide brushes in vapor phase.

Biological model and virus-like surface. The uniform end-group functionality and submicron spacing superficially resembles the capsid and antigen structure of several types of viruses, which are responsible for cell recognition and invasion and antibody recognition.

Results showing nanoparticle attachments on the brushes. As shown in the SEM image (FIG. 10A), the gold nanoparticles only attached to the brush region but not the silicon wafer after brief rinsing and sonication in water for 30 s and acetone for 30 s. Successful end-point modification with tetraphenylethene, a material that shows florescent properties, was also confirmed by elemental analysis via XPS Spectroscopy (FIG. 10B).

Stimuli-responsive surfaces with dual properties. A surface with nanospikes can be further processed to form a second brush in the blank area. By controlling the swelling of the surrounding brushes, we can expose or bury the active end-group of the spikes, and hence achieving surface with switchable morphology and functionality. Binary brushes (PBLG-PNIPAM) were formed and morphology changes as the PNIPAM swells characterized.

Solvent-induced active end-group distribution. It was shown that PBLG brushes after the solvent quenching approach will have a uniform upright alignment with all the amine-group pointing up. Such phenomena were also observed where the brush morphology changed drastically after being processed by different solvent combinations.

As such, the tilt angle and orientation of the rod brushes can be adjusted using this approach. We are currently studying the underlying principle of this behavior and developing technique to gain better control in such behavior.

Area-Selective Deposition of Initiators. Common aminosilanes, such as 3-aminopropyl-triethoxysilane (APTES), 3-aminopropyl-trimethoxysilane (APTMS), can diffuse through the resist since they are smaller in sizes, hence causing excess brush growth in masked area as shown in the figure. The steric hindrance caused by the isopropyl groups on APDIPES effectively limited such diffusion, hence making the patterning (e.g., on silicon oxide) possible.

In addition, while steric hindrance is favored for limiting diffusion, it is not desired for high grafting density—the bulkiness of APDIPES makes it harder to form a dense monolayer on silicon oxide compared to that of APTES or APTMS, resulting in low grafting density of the brushes. As such, lots of efforts and optimizations were made to find the sweet point between these trade-offs and obtain substantial brush growth.

Vaporization of NCA Monomer and Uniformity of Brushes. The NCA monomer is a solid under room temperature with a melting point of around 93° C., which makes it hard to form dense vapor that is necessary for vapor phase surface-initiated polymerization. As such, high temperature and strong vacuum are necessary for the process. Initial attempts resulted in poor or no brush formation when temperature gets too high or too low, and when vacuum pressure is not strong enough. Moreover, the purity of the monomer is also critical to the process as impurities can also cause disruptions in vapor formation as well as surface-initiated polymerization—recrystallization was done twice, and the synthesized monomer was kept at −20° C. in nitrogen-purged sealed vials to ensure purity and stability.

Phase separation and solvent-induced brush alignment. While there are various reported studies on nanopatterned polymer brushes, we are the first study that reported nanopatterned polypeptide brushes with features smaller than 50 nm and well-defined phase aggregation. Poor phase separation has been a common problem for most of the nanopatterned brushes study due to insufficient support at the edge of the brushes, resulting in large feature size and low resolution. Polypeptides, especially PBLG, can form self-aggregates after "solvent quenching" treatment, which provides formation of clean spiky surfaces that has location-specific tunable anisotropic properties and chemical properties in sub-50 nm scale. However, the precise control of such aggregation behavior is non-trivial. It was found that the uniformity of unidirectional alignment in upright direction can be a difficult in sub-10 nm scale—for example, for PBLG nanospikes, the numbers of "bundles" per patterned area can be inhomogeneous.

EXAMPLE 4

This example provides a description of compositions, devices, and methods of the present disclosure and uses thereof.

Compositions and devices of the present disclosure were used to analyze benzene, toluene, and xylene (collectively known as BTX gases). These are volatile organic compounds used extensively in industrial products. Commonly found in gasoline, and used as solvents/additives for manufacturing, auto exhaust, industrial emissions, etc. These are also, high toxic to humans. They are known carcinogens, know to degenerate bone marrow, cause aplastic anemia and/or leukemia etc. The permissible exposure limit to these compounds is: benzene: 0.5~1 ppm in 8 hours, toluene: 100 ppm in 8 hours, and xylene: 100 ppm in 8 hours.

The analysis was carried out as described in Example 3. The results of the analysis are shown in FIGS. 5-7, 20 and 21.

Although the present disclosure has been described with respect to one or more particular embodiments and/or examples, it will be understood that other embodiments and/or examples of the present disclosure may be made without departing from the scope of the present disclosure.

The invention claimed is:

1. A device comprising:
a substrate; and
a plurality of polymer nanostructures disposed on at least a portion of a surface of the substrate,
wherein at least a portion or all of the polymer nanostructures comprise uniform end groups comprising a fluorescent end group, and
wherein the polymer nanostructures are arranged in a pre-determined pattern.

2. The device of claim 1, wherein the polymer nanostructures are self supporting.

3. The device of claim 1, wherein the polymer nanostructures comprise one or more polypeptide group(s) of the like.

4. The device of claim 1, wherein the fluorescent end group comprises a rhodamine B group, a tetraphenylethene group, a fluorescein group, a tryptophan group, a tyrosine group, or a triphenylamine group.

5. The device of claim 1, wherein the device comprises a volatile organic compound (VOC) sensor.

6. A method of making the device of claim 1, comprising:
forming a layer of patterned photoresist disposed on at least a portion of the substrate comprising a pattern of first openings through the layer of photoresist;
depositing one or more initiator(s) on at least a portion or at least some on of the first openings;
contacting the substrate with one or more monomer(s), wherein the polymer nanostructures are formed by polymerization of the one or more monomer(s); and
optionally, removing the photoresist.

7. The method of claim 6, wherein the polymerization comprises a surface-initiated polymerization.

8. The method of claim 6, the method further comprising modifying at least a portion of or all of the end groups of the polymer nanostructures.

9. The method of claim 6, the method further comprising contacting the polymer nanostructures with one or more solvent(s).

10. A system comprising:
a device of claim 1;
one or more detector(s); and
a housing comprising a sample receiving area,
wherein the one or more detector(s) is/are positioned in, partially within, or external to the housing to detect the device disposed at the sample receiving area.

11. The system of claim 10, wherein the housing further comprises a fluid inlet and a fluid outlet or a gas inlet and a gas outlet, the fluid inlet and the fluid outlet or the gas inlet and the gas outlet selectively operable to control a fluidic environment or a gas environment within the housing.

12. The system of claim 11, further comprising a pump disposed upstream of the fluid inlet or the gas inlet or disposed downstream of the fluid outlet or the gas outlet.

13. The system of claim 10, wherein the one or more detector(s) comprises a scanning electron microscope, an atomic force microscope, an ellipsometer, an optical reflectometer, a fluorescence detector, or any combination thereof.

14. The system of claim 10, wherein the system further comprises a display, a camera, a computer, a communication device, a non-transitory storage medium, or any combination thereof to respectively display, record, process, communicate, store, or any combination thereof an output of the one or more detector(s).

15. A method of determining a presence or an absence of one or more analyte(s) or a concentration of one or more analyte(s) in a sample comprising:
    contacting one or more device(s) of claim 1; and
    determining one or more change(s) or an absence of one or more change(s) in at least a portion of or all of the polymer nanostructures of one or more or all of the device(s), wherein the change(s) indicate the presence or the absence of the analyte(s) or correlate to the concentration of the analyte(s) in a sample.

16. The method of claim 15, wherein at least a portion of or all of the plurality of polymer nanostructures independently comprises an acrylate polymer group or a polypeptide group.

17. The method of claim 16, wherein the polypeptide group is chosen from poly(γ-benzyl L-glutamate) (PBLG) groups, poly(γ-benzyl D-glutamate) groups, poly(β-benzyl-1-aspartate) (PBLA) groups, poly(γ-methyl-L-glutamate) (PMLG) groups, poly(β-phenethyl-L-aspartate) groups, and any combination thereof.

18. The method of claim 15, wherein the sample is a gas sample, or a liquid sample.

19. The method of claim 15, wherein the sample is chosen from ambient air samples, industrial process samples, ventilation system samples, or laboratory samples.

20. The method of claim 15, wherein the analyte(s) is/are chosen from volatile organic compounds and any combination thereof.

21. The method of claim 15, wherein the change(s) is/are chosen from morphology changes, thickness changes, surface roughness changes, film color changes, fluorescence changes, polarization changes, and any combination thereof.

22. The method of claim 15, wherein the at least a portion or all of the polymer nanostructures are in a quenched state prior to contact with the sample.

23. The method of claim 15, wherein the change(s) is/are chosen from morphology changes, thickness changes, surface roughness changes, film color changes, fluorescence changes, polarization changes, and any combination thereof.

24. A method of determining a presence or an absence of one or more analyte(s) or a concentration of one or more analyte(s) in a sample comprising:
    contacting one or more device(s), each device comprising:
        a substrate; and
        a plurality of polymer nanostructures disposed on at least a portion of a surface of the substrate, wherein the at least a portion or all of the polymer nanostructures are in a quenched state prior to contact with the sample; and
    determining one or more change(s) or an absence of one or more change(s) in at least a portion of or all of the polymer nanostructures of one or more or all of the one or more device(s), wherein the change(s) indicate the presence or the absence of the analyte(s) or correlate to the concentration of the analyte(s) in a sample.

25. The method of claim 24, wherein at least a portion of or all of the polymer nanostructures independently comprise an acrylate polymer group or a polypeptide group.

26. The method of claim 25, wherein the polypeptide group comprises an intrinsically fluorescent polypeptide group.

27. A method of determining a presence or an absence of one or more analyte(s) or a concentration of one or more analyte(s) in a sample comprising:
    contacting one or more device(s), each device comprising:
        a substrate; and
        a plurality of polymer nanostructures disposed on at least a portion of a surface of the substrate, wherein at least a portion of or all of the polymer nanostructures independently comprise an acrylate polymer group or a polypeptide group and the polymer nanostructures are arranged in a pre-determined pattern,
    with the sample; and
    determining one or more change(s) or an absence of one or more change(s) in at least a portion of or all of the polymer nanostructures of one or more or all of the one or more device(s), wherein the change(s) indicate the presence or the absence of the analyte(s) or correlate to the concentration of the analyte(s) in a sample.

* * * * *